US012749745B2

(12) United States Patent
Hartl

(10) Patent No.: US 12,749,745 B2
(45) Date of Patent: Sep. 29, 2026

(54) ELECTRICAL FEEDTHROUGH GLASS-METAL ELECTRODES

(71) Applicant: SCHOTT AG, Mainz (DE)

(72) Inventor: Helmut Hartl, Vienna (AT)

(73) Assignee: SCHOTT AG, Mainz (DE)

( * ) Notice: Subject to any disclaimer, the term of this patent is extended or adjusted under 35 U.S.C. 154(b) by 476 days.

(21) Appl. No.: 17/328,746

(22) Filed: May 24, 2021

(65) Prior Publication Data

US 2021/0280934 A1 Sep. 9, 2021

Related U.S. Application Data

(63) Continuation of application No. PCT/EP2019/082032, filed on Nov. 21, 2019.

(30) Foreign Application Priority Data

Nov. 23, 2018 (DE) ..................... 10 2018 220 118.8
Sep. 12, 2019 (DE) ..................... 10 2019 213 901.9
Oct. 15, 2019 (EP) .................................... 19000469

(51) Int. Cl.
*H01M 50/169* (2021.01)
*H01M 50/107* (2021.01)
(Continued)

(52) U.S. Cl.
CPC ....... *H01M 50/169* (2021.01); *H01M 50/157* (2021.01); *H01M 50/534* (2021.01); *H01M 50/536* (2021.01); *H01M 50/107* (2021.01)

(58) Field of Classification Search
CPC ....... Y02E 60/10; C03C 17/022; C03C 3/085; C03C 3/097; C03C 3/19; C03C 27/02;
(Continued)

(56) References Cited

U.S. PATENT DOCUMENTS 961,672 A 6/1910 Barnhurst
4,158,721 A 6/1979 Decker et al.
(Continued)

FOREIGN PATENT DOCUMENTS

CN 207852738 U 9/2018
DE 27 33 948 A1 8/1978
(Continued)

OTHER PUBLICATIONS

Donald et al., "Recent developments in the preparation, characterization and applications of glass-and glass-ceramic-to-metal seals and coatings," Journ Mat Sci (2011) 46, p. 1975-2000. (Year: 2011).*

(Continued)

*Primary Examiner* — Allison Bourke
*Assistant Examiner* — Bethany C Garcia
(74) *Attorney, Agent, or Firm* — TAYLOR & EDELSTEIN, PC

(57) ABSTRACT

An electrical device, having a feedthrough through a housing part which has a material thickness T of the housing of the device and is made of metal. The metal being iron, iron alloys, iron-nickel alloys, iron-nickel-cobalt alloys, KOVAR, steel, high-grade steel, aluminum, aluminum alloys, AlSiC, magnesium, magnesium alloys, titanium or titanium alloys. The housing part having at least one opening, wherein the opening receives a contact element, being a conductor consisting of a conductive material in a glass or glass ceramic material. The housing part has a collar in the region of the opening and thus forms an inner wall of the feedthrough opening having a height H, which is greater than material thickness T, wherein glazing length EL of the glass or glass ceramic material preferably corresponds to height H.

30 Claims, 8 Drawing Sheets

(51) Int. Cl.
*H01M 50/157* (2021.01)
*H01M 50/534* (2021.01)
*H01M 50/536* (2021.01)

(58) Field of Classification Search
CPC .. C03C 8/04; C03C 8/08; C03C 29/00; C03C 2204/00; C03C 2207/08; C03C 8/00–24; Y10T 29/49108; Y10T 29/49101; Y10T 29/49115; Y10T 403/217; Y10T 428/12535; Y10T 428/24917; Y10T 428/24926; Y10T 10/70; Y10T 29/4911; H01G 11/80; H01G 4/018; H01G 4/224; H01G 4/35; H01G 4/40; H01G 11/74–84; H01G 2/103; H01G 4/012–236; H01G 9/10; H01M 50/103; H01M 50/109; H01M 50/121; H01M 50/119; H01M 50/15; H01M 50/159; H01M 50/174; H01M 50/191; H01M 50/553; H01M 50/562; H01M 50/176; H01M 50/566; H01M 50/157; H01M 50/179; H01M 50/534; H01M 50/536; H01M 50/107; H01M 50/169; H01M 50/186; H01M 50/188–198; H01M 10/0525; H01M 2300/0037; H01M 2200/00; H01M 50/193–198; H01M 50/55; H01M 50/529; H01M 50/147–198; H01M 10/052; B23K 1/19; B23K 15/0093; B23K 2101/36; B23K 2103/10; B23K 26/32; H01B 17/305; H05K 1/053; H05K 2201/09581; H05K 2201/09809; H05K 2201/10015; H05K 2203/0315; H05K 2203/1147; H05K 2203/1438; H05K 3/4053; H05K 3/4061; H05K 3/426; H05K 3/445; H05K 1/0306–181; Y10S 428/901; A61N 1/3754
See application file for complete search history.

(56) References Cited

U.S. PATENT DOCUMENTS

| | | | | | |
|---|---|---|---|---|---|
| 4,279,975 | A | | 7/1981 | Bowsky | |
| 4,841,101 | A | | 6/1989 | Pollock | |
| 5,015,530 | A | | 5/1991 | Brow et al. | |
| 5,104,755 | A | | 4/1992 | Taylor et al. | |
| 5,227,250 | A | | 7/1993 | Bobal et al. | |
| 5,542,300 | A | | 8/1996 | Lee | |
| 5,565,262 | A | * | 10/1996 | Azzaro | C03C 3/085 428/209 |
| 5,773,959 | A | | 6/1998 | Merritt et al. | |
| 5,849,434 | A | | 12/1998 | Miura et al. | |
| 5,853,914 | A | | 12/1998 | Kawakami | |
| 5,874,185 | A | | 2/1999 | Wang et al. | |
| 5,900,183 | A | | 5/1999 | Kronfli et al. | |
| 5,952,126 | A | | 9/1999 | Lee et al. | |
| 6,190,798 | B1 | | 2/2001 | Okada et al. | |
| 6,274,252 | B1 | | 8/2001 | Naugler et al. | |
| 6,433,276 | B1 | | 8/2002 | Bellora | |
| 7,341,802 | B1 | * | 3/2008 | Ota | H01M 50/191 429/181 |
| 7,651,762 | B2 | | 1/2010 | Xu et al. | |
| 7,687,200 | B2 | | 3/2010 | Jouanneau-Si-Larbi et al. | |
| 2002/0136943 | A1 | * | 9/2002 | Warchocki | A61N 1/378 429/175 |
| 2004/0062985 | A1 | * | 4/2004 | Aamodt | H01M 50/103 429/180 |
| 2009/0233168 | A1 | * | 9/2009 | Yoshida | H01M 50/183 429/185 |
| 2014/0099533 | A1 | * | 4/2014 | Hartl | H01M 50/191 29/623.2 |
| 2014/0106210 | A1 | * | 4/2014 | Deng | H01M 50/15 429/179 |
| 2015/0364735 | A1 | | 12/2015 | Kohira et al. | |
| 2017/0149028 | A1 | * | 5/2017 | Kroll | C03C 4/20 |
| 2018/0083256 | A1 | * | 3/2018 | Marasco | H01M 50/562 |

FOREIGN PATENT DOCUMENTS

| | | | | | |
|---|---|---|---|---|---|
| DE | 690 23 071 | T2 | | 6/1996 | |
| DE | 101 05 877 | A1 | | 8/2001 | |
| DE | 698 04 378 | T2 | | 10/2002 | |
| DE | 699 23 805 | T2 | | 7/2005 | |
| DE | 10 2007 063 188 | A1 | | 6/2009 | |
| EP | 0061725 | B1 | * | 10/1985 | H01M 50/342 |
| EP | 0 412 655 | A2 | | 7/1990 | |
| EP | 0 885 874 | A1 | | 12/1998 | |
| EP | 0 954 045 | A2 | | 11/1999 | |
| GB | 2 067 345 | A | | 7/1981 | |
| GB | 2 248 526 | A | | 4/1992 | |
| WO | 2012/110242 | A1 | | 8/2012 | |
| WO | 2012/110244 | A1 | | 8/2012 | |
| WO | 2012/110246 | A1 | | 8/2012 | |
| WO | 2012/167921 | A1 | | 12/2012 | |
| WO | 2014/176533 | A1 | | 10/2014 | |
| WO | 2018/114392 | A2 | | 6/2018 | |

OTHER PUBLICATIONS

EP 0061725 B1—English translation via Espacenet, Accessed Dec. 23, 2025 (Year: 2025).*

International Search Report Dated May 7, 2020 for International Application No. PCT/EP2019/082032 (11 pages).

"Handbook of Batteries", published by David Linden, 2nd issue, McGrawhill, 1995, Chapters 36 & 39 (88 pages).

* cited by examiner

X2

ELECTRICAL FEEDTHROUGH GLASS-METAL ELECTRODES

CROSS REFERENCE TO RELATED APPLICATIONS

This is a continuation of PCT application no. PCT/EP2019/082032, entitled "ELECTRICAL FEEDTHROUGH GLASS-METAL ELECTRODES", filed Nov. 21, 2019, which is incorporated herein by reference. PCT application no. PCT/EP2019/082032 claims the priority of German patent application no. 10 2018 220 118.8 entitled "ELECTRICAL FEEDTHROUGH GLASS-METAL ELECTRODES", filed on Nov. 23, 2018, which is incorporated herein by reference. PCT application no. PCT/EP2019/082032 claims the priority of German patent application no. 10 2019 213 901.9 entitled "ELECTRICAL FEEDTHROUGH GLASS-METAL ELECTRODES", filed on Sep. 19, 2019, which is incorporated herein by reference. PCT application no. PCT/EP2019/082032 claims the priority of European patent application no. 19000469.7 entitled "ELECTRICAL FEEDTHROUGH GLASS-METAL ELECTRODES", filed on Oct. 15, 2019, which is incorporated herein by reference.

BACKGROUND OF THE INVENTION

1. Field of the Invention

The invention relates to an electrical device, in particular an electrical storage device, such as a micro-battery and/or a capacitor.

2. Description of the Related Art

In the sense of the current invention, batteries are understood to be disposable batteries which are disposed of and/or recycled after their use, as well as accumulators. Accumulators, preferably lithium-ion batteries are intended for various applications, for example for portable electronic equipment, cell phones, power tools and in particular electric vehicles. The batteries can replace traditional energy sources, for example lead-acid batteries, nickel-cadmium batteries, or nickel-metal hydride batteries. Use of batteries in sensors is possible or in internet related devices.

Storage devices in the sense of the current invention are also understood to be capacitors, in particular super capacitors.

Super capacitors, also referred to as super caps are, as generally known, electrochemical energy storage devices having an especially high output density. Super capacitors, in contrast to ceramic-, film- and electrolytic capacitors are not a dielectric in the conventional sense. In particular, they actualize the storage principles of static storage of electric energy by means of charge separation in a double layer capacitance and also the electrochemical storage of electric energy by means of charge exchange with the assistance of a redox reaction in a pseudo capacity.

Super capacitors include hybrid capacitors, especially lithium-ion-capacitors. Their electrolytes are normally a solvent in which conductive salts, normally lithium salts are dissolved. Super capacitors are generally used in applications where a very high number of charge and discharge cycles are required. Super capacitors are used especially advantageously in the automotive sector in particular in the area of recuperation of braking energy. Other applications are obviously also possible and are covered by the current invention.

Lithium-ion batteries as storage devices have been known for many years. In this regard we refer you to the "Handbook of Batteries, published by David Linden, 2nd issue, McGrawhill, 1995, chapter 36 and 39".

Various aspects of lithium-ion batteries are described in a multitude of patents.

Some examples are: U.S. Pat. Nos. 961,672 A1, 5,952,126 A1, 5,900,18 A1, 5,874,185 A1, 5,849,434 A1, 5,853,914 Alas well as U.S. Pat. No. 5,773,959 A1.

Lithium-ion batteries, in particular for applications in the automobile industry generally feature a multitude of individual battery cells which are generally connected in-series. The in-series connected battery cells are usually combined into so-called battery packs and then to a battery module which is also referred to as a lithium-ion battery. Each individual battery cell has electrodes which are led out of a housing of the battery cell. The same applies to the housings of super capacitors.

In particular with the use of lithium-ion batteries in the automotive environment, a multitude of problems such as corrosion resistance, stability in accidents or vibration resistance must be solved. An additional problem is the seal, in particular the hermetic seal over an extended period of time.

The seal may be compromised, by example, by leakage in the region of the electrodes of the battery cell or the electrode feedthrough in the battery cell and/or the housing of capacitors and/or super capacitors. Such leakages may, for example, be caused by temperature change stresses and alternating mechanical stresses, for example, vibrations in the vehicle or an aging of the synthetic material.

A short-circuit or temperature change in the battery or battery cell can lead to a reduced life span of the battery or the battery cell. Equally as important is the impermeability of the seal in accident and/or emergency situations.

In order to ensure better stability in accidents, a housing for a lithium-ion battery is suggested for example in DE 101 05 877 A1, whereby the housing includes a metal jacket which is open on both sides and which is being sealed.

The power connection or respectively the electrode are insulated by plastic material. A disadvantage of the plastic insulations is the limited temperature resistance, the limited mechanical stability, aging and the unreliable dependability of the seal over the service life.

The feedthroughs in the lithium-ion batteries and capacitors according to the current state of the art are therefore not integrated hermetically sealed into the cover part of the lithium-ion battery. Thus, at a pressure difference of 1 bar a maximum helium leakage rate of $1\cdot10^{-6}$ mbar 1 $s^{-1}$ is generally reached at the current state of the art, depending on the test specifications. Moreover, the electrodes are crimped, and laser welded connecting the components with additional insulators arranged in the interior of the battery.

An alkaline battery has become known from DE 27 33 948 A1 wherein an insulator, for example glass or ceramic is joined directly by means of a fusion seal with a metal component.

One of the metal parts is connected electrically with an anode of the alkaline battery and the other is connected electrically with a cathode of the alkaline battery. The metals used in DE 27 33, 948 A1 are iron or steel. Light metals like aluminum are not described in DE 27 33 948 A1. Also, the sealing temperature of the glass or ceramic material is not specified in DE 27 33 948 A1. The alkaline battery described in DE 27 33 948 A1 is a battery with an alkaline electrolyte which, according to DE 27 33 948 A1 contains sodium hydroxide or potassium hydroxide. Li-ion batteries are not mentioned in DE 27 33 948 A1.

A method to produce asymmetrical organic carboxylic acid esters and to produce anhydrous organic electrolytes for alkali-ion batteries has become known from DE 698 04 378 T2 or respectively EP 0885 874 B1. Electrolytes for rechargeable lithium-ion cells are also described in DE 698 04 378 T2 or respectively EP 0 885 874 B1.

Materials for the cell pedestal which receives the through-connection are not described; only materials for the connecting pin which may consist of titanium, aluminum, a nickel alloy or stainless steel.

An RF feedthrough with improved electrical efficiency is described in DE 699 23 805 T2 or respectively EP 0 954 045 B1. The feedthroughs known from DE 699 23 805 T2 or respectively EP 0 954 045 B1 are not glass-metal feedthroughs. Glass-metal feedthroughs which are provided immediately inside for example the metal wall of a packing, are described in EP 0 954 045 B1 as being disadvantageous since RF feedthroughs of this type are not durable due to embrittlement of the glass.

DE 690 230 71 T2 or respectively EP 0 412 655 B1 describes a glass-metal feedthrough for batteries or other electro-chemical cells, whereby glasses having a $SiO_2$ content of approximately 45 weight-% are being used and metals, in particular alloys are being used which contain molybdenum and/or chromium and/or nickel. The use of light metals is also insufficiently addressed in DE 690 230 71 T2, as are sealing temperatures or bonding temperatures for the used glasses. According to DE 690 230 71 T2 or respectively EP 0 412 655 B1 the materials used for the pin-shaped conductor are alloys which contain molybdenum, niobium or tantalum.

A glass-metal feedthrough for lithium-ion batteries has become known from U.S. Pat. No. 7,687,200 A1. According to U.S. Pat. No. 7,687,200 A1 the housing was produced from high-grade steel and the pin-shaped conductor from platinum/iridium. The glass materials cited in U.S. Pat. No. 7,687,200 A1 are glasses TA23 and CABAL-12. According to U.S. Pat. No. 5,015,530 A1 these are CaO—MgO—$Al_2O_3$—$B_2O_3$ systems having sealing temperatures of 1025° C. or 800° C. Moreover, glass compositions for glass-metal feedthroughs for lithium batteries have become known from U.S. Pat. No. 5,015,530 A1 which contain CaO, $Al_2O_3$, —$B_2O_3$, SrO and BaO whose sealing temperatures are in the range of 650° C.-750° C. and which are therefore too high for use with light metals.

A feedthrough has become known from U.S. Pat. No. 4,841,101 A1 wherein an essentially pin-shaped conductor is sealed into a metal ring with a glass material. The metal ring is then inserted into an opening or bore in a housing and is joined, in particular in a material-to-material manner with the interior wall or respectively the bore through welding, for example after the interlocking of a welding ring. The metal ring consists of a metal which has essentially the same or similar thermal coefficient of expansion as the glass material in order to compensate for the high thermal coefficient of expansion of the aluminum of the battery housing. In the design variation described in U.S. Pat. No. 4,841,101 A1 the length of the metal ring is always shorter than the bore or opening in the housing.

Feedthroughs, which are passed through a housing part of a housing for a storage device have become known from WO 2012/167921 A1, from WO 2012/110242 A1, from WO 2012/110246 A1 and WO 2012/110244 A1. In the feedthroughs a cross section is passed in a glass or glass ceramic material through the opening.

In DE 27 33 948 A1 a feedthrough is shown through a housing part of a battery, wherein the housing part has at least one opening, wherein the opening includes a conductive material, as well as a glass or glass ceramic material, and wherein the conductive material is designed as a cap-shaped element. No indication is however given in DE 27 33 948 A1 as to which specific material the conductor consists of. Also, no indication is provided in DE 27 33 948 Alas to the wall thickness of the cap-shaped element.

A battery with a feedthrough which has one opening has become known from U.S. Pat. No. 6,190,798 A1 wherein the conductor is a cap-shaped element and is inserted into the opening in an insulating material, which may be glass or a resin. There is also no indication in U.S. Pat. No. 6,190,798 A1 regarding the wall thickness of the cap-shaped element.

US 2015/0364 735 A1 shows a battery with a cap-shaped cover which has areas of reduced thickness as a safety outlet in the case of a pressure overload.

A conical overpressure relief safeguard has become known from WO 2014/176 533 A1. An application for batteries is not described in WO 2014/176 533 A1.

DE 10 2007 063 188 A1 shows a battery with at least one single cell enclosed by a housing and a housing type overpressure relief safeguard in the form of one or several predetermined breaking points or one or several rupture disks.

U.S. Pat. No. 6,433,276 A1 shows a feedthrough wherein the metallic housing part, conductor, and glass material have substantially the same coefficient of expansion.

It is disadvantageous on all electrical devices, in particular on storage devices, according to the current state of the art, that the known electrical devices, in particular the storage devices, are very large and do not include compact housings. This results in large dimensions, particularly large heights in storage devices. Another problem with electrical devices that had conventional feedthroughs was the use of plastic materials for electrical insulation. Thus, Nylon, polyethylene, and polypropylene are described as insulating materials in DE 27 33 948 A1.

It is therefore the objective of the current invention to specify an electrical device, in particular a storage device, whereby the disadvantages of the state of the art are avoided.

SUMMARY OF THE INVENTION

The present invention relates to an electrical storage device, and in particular, a compact storage device.

A small housing thickness should preferably be made possible which, in addition to providing compactness also leads to material savings. Moreover, a secure electrical insulation of the conductor, in particular metal pins, are inserted into the feedthrough opening of the housing. It is herein an objective to provide a storage device which in itself is compact to the extent that as much volume as possible is available in the housing interior, resulting in the provision that the battery and/or capacitor can have the highest possible capacity. Thus, the storage device with feedthroughs according to the invention is suitable for micro-batteries. The present invention also relates to hermetically sealed micro-batteries having a feedthrough, as shown in this application.

Typical applications for micro-batteries are, for example, active RFID devices and/or medical devices, such as hearing aids, blood pressure sensors and/or wireless headphones. In this connection, the concept is often used and is thus generally known. Equally of interest are micro-batteries for internet related devices.

According to the present invention, this objective is met by an electrical device, in particular a storage device as claimed below.

The electrical device, in particular the storage device includes a feedthrough having an opening into which a conductor, which is also referred to as a contact element, is glazed.

A disadvantage with solid pins as conductors is the high material usage on the one hand. An additional disadvantage of the pins, designed as a solid component, is their rigid connection with the glass, as well as the fact that, in the case of the housing, they are used in a storage device, taking up a lot of space, whereby space, for example in the housing of the storage device, in the current case in the battery housing is lost. In particular, in the case of a transverse load, which may occur, for example, during a mechanical and/or a pressure load of the storage device the pin formed of solid material presses onto the glass which can lead to the glass breaking or cracks occurring in the glass.

Another disadvantage with storage devices, according to the current state of the art, was that a sealed connection of the feedthrough with the housing of the storage device, for example the battery, was difficult.

The electric device according to the present invention, in particular the electrical storage device or sensor housing, preferably a battery, in particular a micro-battery or a capacitor with a feedthrough through a housing part having a material thickness T of the housing of the device, consisting of a metal. The metal is in particular iron, iron alloys, iron-nickel alloys, iron-nickel-cobalt alloys, KOVAR, steel, high-grade steel, aluminum, an aluminum alloy, AlSiC, magnesium, a magnesium alloy or titanium or a titanium alloy. The housing part has at least one opening, wherein the opening receives a contact element made of a conductive material in a glass or glass ceramic material. The housing part has a collar in the region of the opening and thus forms an inner wall of the feedthrough opening having a height H which is greater than the material thickness T, wherein the glazing length of the glass or glass ceramic material corresponds to height H. The collar is formed preferably by a drawn-up edge of the housing part.

In order to be able to simply raise the collar, the collar is intended to be an upward bulging reshaped collar.

In an especially advantageous embodiment of the present invention, the housing part and the collar are a single component, however, they do not have to be.

Material thickness T of the housing part is preferably 0.1 mm to 0.3 mm. The length of the inner wall, which specifies the glazing length and is identified by H or EL is in the range of 0.3 mm to 1.0 mm, especially 0.3 mm to 0.5 mm and is formed by the drawn-up edge.

The housing of the electrical device has preferably a first thermal coefficient of expansion $a_1$, the glass and/or glass ceramic material has a second thermal coefficient of expansion 2 and/or the conductor has a third thermal coefficient of expansion $a_3$. In particular, the thermal coefficients of expansion $a_1$, $a_2$ and/or $a_3$ vary essentially by $2*10^{-6}$ l/K at most, preferably by no more than $1*10^{-6}$ l/K, particularly they are substantially the same. The thermal coefficients of expansion $a_1$, $a_2$, $a_3$ are in the range of 3 to $7*10^{-6}$ l/K, preferably 4.5 to $5.5*10^{-6}$ l/K or in the range of $9*10^{-6}$ l/K to $11*10^{-6}$ l/K.

In order to avoid a short circuit of the connection with the metal housing or the storage device, for example the battery or the capacitor, it may be provided that an insulating element is arranged on the glass or glass ceramic material, which can be made in particular of a plastic material or glass or glass ceramic material and in particular covers the front face of the collar. Alternatively, to the separate insulating element, a glass material protruding beyond the edge, consisting for example of a foaming glass, may also be provided. The plane of the surface of the collar is positioned preferably below the plane of the surface of the contact element, preferably of the electrical conductor which is fed through the feedthrough. It is particularly preferred that the surface of the insulating element is on one plane with the surface of the contact element or respectively the electric conductor which is inserted into the opening of the feedthrough.

According to the present invention, a feedthrough is also specified which facilitates contacting of a conductor that would provide as much assembly space in the interior of the housing as possible. The feedthrough is hermetically sealed and which, in particular during a mechanical and/or pressure load, in particular in the region between contact and sealing material, offers improved compatibility with the brittle sealing material. The feedthrough of the electrical device, in particular the battery finds application in a housing component, for example in a battery and/or capacitor cover for an electrical device. The expansion of the assembly space contributes, in particular to increasing the capacity of the storage device.

According to the present invention, the feedthrough, in particular through a housing part of the housing wherein the housing part has at least one opening, has a conductive material as well as a glass or glass ceramic material as an electrically insulating sealing material. The conductive material is inserted into the glass or glass ceramic material and in one embodiment is not a solid component, in particular not a solid pin shaped conductor, but simply a cap-shaped element. Preferred materials for the cap-shaped element are KOVAR, titanium, titanium alloys, steel, stainless steel or high-grade steel, aluminum, an aluminum alloy, AlSiC, magnesium as well as a magnesium alloy. In this embodiment a cap-shaped element is used as a conductor instead of a solid conductor.

The design as a cap-shaped element, which is inserted into the glass or glass ceramic material as a conductor, has the advantage that, on the basis of the comparatively thin side walls of the cap-shaped element, the combination of the cap-shaped element with the glass or glass ceramic material is more resistant to mechanical transverse loads, which occur during thermal stresses, but also during pressure loads in the interior of the housing. On the basis of its elasticity the cap-shaped element can thus compensate for transverse loads so that pressure onto the glass or the glass ceramic material and avoid failure of the sealing material. Moreover, on the basis of such a design, substantial material savings are achieved as compared to a solid pin. Due to the design as a cap-shaped element, additional assembly space is created inside the housing, for example the battery housing. This facilitates larger surfaces of the cap-shaped conductor and thereby the connecting area, and at the same time providing a larger available assembly space. With the design according to the present invention higher thermal resistance is also achieved compared to a feedthrough design with a solid pin. In addition, the housing assembly space is increased since conductor contacting occurs in the cap-shaped element. This makes it possible to achieve a higher battery output density at increased overall volume with the same outside dimensions. It is especially preferred if the thickness and/or wall thickness of the cap-shaped element is in the range of 0.1 mm to 0.3 mm. Such a thinly designed cap element has many advantages. If cap-shaped elements with a connection surface and side walls that are thin, have a wall thickness outside the base stamping of the cap in the region of 1.1 mm to 0.3 mm they have the advantage that, in contrast to solid pins, they can absorb transverse loads, in the event of thermal stresses. Furthermore, the thin metal, in contrast to a massive one, can yield flexibly resiliently, thus avoiding damage to the glass material.

The cap-shaped element has a connecting surface and side walls, in particular thin side walls, as well as a hollow space in the cap.

According to the present invention the cap-shaped element can be produced in the form of a drawn component. The drawn component is preferably produced by deep drawing. Deep drawing is a tensile-compression forming process and a most important sheet metal forming process, which is widely used in mass production. Deep drawing is achieved with the assistance of forming tools, impact devices and impact energy. The thereby produced cap-shaped element is especially advantageously a one-piece component.

Due to mass production the cap produced by deep drawing is cost effective, material saving and efficiently producible.

In order to electrically and/or mechanically connect a conductor with the cap-shaped element provision is made that the cap includes a tongue, which is notably connected with the connecting surface and/or the side wall facing the hollow space in the cap. In an especially preferred embodiment it is possible that the hollow space in the cap of the cap-shaped element serves to accommodate sensor devices, for example temperature and/or pressure gauges. The temperature and/or pressure gauges can be a part of safety devices.

It is moreover advantageous if the cap-shaped element has at least one base stamping, especially for pressure release. The material thickness is reduced in the region of the base stamping; the wall thickness of the cap is thus less in the area of the base stamping than in the remaining regions. Under load the base stamping acts as a predetermined breaking point. The base stamping can be introduced in the side of the cap-shaped element that is facing toward, or away from, the hollow space in the cap. Combinations of this arrangement are also conceivable and are included in the invention. By means of the base stamping, a safety valve and/or a safety outlet is created. In the sense of this description, the term “safety valve” also encompasses the concept of a safety outlet. On the basis of the selection of the remaining wall thickness in the region of the base stamping it can be preset at what load, in particular at what pressure, the safety valve is triggered. With a greater remaining wall thickness, an activation occurs at high pressures, and with a small remaining wall thickness an activation occurs at very low pressures. With the related thin sheet metals, the wall strength or thickness of the cap in the region outside the base stamping is advantageously in the range of 0.1 mm to 0.3 mm. Based on the reduced thickness, in the area of the base stamping, the cover opens very quicky on the basis of pressure loads, in particular in an overload event, so that the cap-shaped element acts as a safety valve. The thickness of the cap, in the region of the base stamping, that is the remaining wall thickness or remaining material strength is preferably in the range of 10 μm to 50 μm, depending upon at which pressure the safety valve should be triggered. Accordingly, the base stamping is a safety release in the event of a pressure overload.

Alternatively, to the design of the base stamping as a safety valve, it is also conceivable to design the side walls of the caps in such a way, for example conically, such that, in the event of failure of the battery and/or the capacitor they lead to a pressure release. Based on the size of the cone it is possible to specify at what pressure the cone opens. It generally applies that, if the cone becomes larger in the direction of the opening, the opening pressure becomes less, and vice versa.

The existence of the safety valve has the advantage that in the event of an activation, the pressure can escape at a defined location. On the other hand the housing may tear open over a large area and/or explode, thus endangering people or objects in the vicinity due to shrapnel impact.

It is also possible that, due to reshaping, in particular deep drawing, the cap-shaped element experiences a weakening in the transitional region between the connecting surface and the side wall, so that, in the event of an overload, a tear occurs in this transitional region so that a controlled pressure release, with reduced hazard potential is facilitated.

The cap-shaped element is preferably designed to be ring-shaped with a diameter preferably in the range of 1.5 mm to 5 mm, in particular 2.0 mm to 4.00 mm.

The current feedthrough is preferably a so-called matched feedthrough. This means that the thermal coefficient of expansion of the housing ($a_1$) and of the glass and/or glass ceramic material ($a_2$) as well as that of the cap-shaped element ($a_3$) is substantially the same. When using KOVAR, nickel-iron-cobalt alloys, for example, NiCo 2918 with a share of 29% Ni and 18% Co the thermal coefficient of expansion is in the range of 3 to $7*10^{-6}$ 1/K, preferably 4.5 to $5.5*10^{-6}$ 1/K. Alternative materials are iron, iron alloys, iron-nickel alloys, iron-nickel-cobalt alloys, steel, stainless steel, high-grade steel, titanium, titanium alloys, aluminum, aluminum alloys, AlSiC, magnesium, or magnesium alloys.

The present invention moreover provides a feedthrough, in particular through a housing part of a housing, in particular a storage device, preferably a battery or a capacitor made of a metal, in particular iron, iron alloys, iron-nickel alloys, iron-nickel-cobalt alloys, KOVAR, steel, stainless steel, high-grade steel, aluminum, an aluminum alloy, AlSiC, magnesium, a magnesium alloy, titanium or a titanium alloy. The housing part has at least one opening, wherein the opening accommodates a conductive material, preferably a conductor in a glass or glass ceramic material, characterized in that the housing part is drawn upward, so that an opening with a drawn-up edge is created. A collar is created by means of the drawn-up edge.

The drawn-up edge then provides a glazing length. The glazing length is herein identified with EL or H. The drawn-up edge can correspond exactly with the glazing length or may be reduced compared to the glazing length. It is also possible that the drawn-up edge is greater than the glazing length. The glazing length is for example 0.3 mm to 1.0 mm, preferably approximately 0.6 mm.

It is especially preferred if the thermal coefficient of expansion of the conductor, glass and housing is approximately the same. It is particularly preferred if the thermal coefficient of expansion of the conductor ($a_{conductor}$), glass ($a_{glass}$), and housing ($a_{housing}$) is in the range of 9 ppm/K to 11 ppm/K.

In one preferred embodiment the raised edge includes a flexible flange or connects to a flexible flange.

The flexible flange includes a connecting region which serves to connect the feedthrough with the conductor, which is glazed in the glass or glass ceramic material with the housing, for example the housing of the storage device.

Connecting the feedthrough with the housing can be accomplished through welding, in particular laser welding, but also soldering. The connection, for example, by means of welding is such that the He leakage rate is less than $1\cdot10^{-8}$ mbar l/s. The He-leakage rate herein is identical to that of the glazed in conductor and thus, a hermetically sealed housing is provided for a storage device, in particular a battery.

Based on the free space at the flexible flange that is created between the raised edge, which provides glazing length EL or H and the connecting region, pressures acting upon the glass material can be reliably compensated. The flexibility of the flange prevents, for example during temperature fluctuations, a breaking of the glass or compensates for the tensile stresses and compressive stresses due to welding.

In addition to the feedthrough a housing with a feedthrough of this type is also provided, as well as an electrical storage device, in particular a battery or a capacitor with a housing of this type.

The housing is in particular a housing for an electrical storage device which can be a battery as well as a capacitor. The present invention moreover also claims a storage device, in particular a battery or a capacitor with such a housing with feedthrough. A micro-battery may in particular also be used as electrical storage device.

Especially compact electrical storage devices are provided, if the electrical storage device has a total height not exceeding 5 mm, in particular not exceeding 4 mm, preferably not exceeding 3 mm, in particular in the range of 1 mm to 5 mm, preferably 1 mm to 3 mm, as is the case with micro-batteries.

It is especially preferred if the material of the storage device, at least for the housing region which is in contact with the inorganic material, in particular the glass or glass ceramic material, is a metal. The metal being iron, an iron alloy, an iron-nickel alloy, an iron-nickel-cobalt alloy, Kovar, steel, stainless steel, high-grade steel, ferritic high-grade steel, aluminum, an aluminum alloy, AlSiC, magnesium, a magnesium alloy, titanium or a titanium alloy. In addition to the ferritic high-grade steel, KOVAR is also a possible material for a feedthrough according to the invention.

To avoid negative impacts of temperature effects such as glass breakage it is advantageous if the raised edge has a flexible flange for connection of the feedthrough to a housing, for example a battery housing.

The flange itself includes a region, a so-called connecting region, with which the feedthrough is connected to the housing part. The connection can occur through welding, in particular ultrasonic welding or soldering.

The connection between the flange and the battery housing is preferably a largely tight connection, in other words, the He leakage rate is less than $1\cdot10^{-8}$ mbar l/s at a pressure difference of 1 bar.

Instead of the separate insulating elements it may be provided for a feedthrough through a housing part of a housing with a feedthrough opening, which accommodates a conductor, that an inorganic material, in particular a glass or glass ceramic material is used as an electrically insulating sealing material. The inorganic material, in particular the glass or glass ceramic material covers at least one area of a partial surface of the housing component. Instead of the sealing material, which is electrically insulating, a separate insulating element can also cover the area of the partial surface of the housing part.

Besides the metal pin, a cap can also be used as a conductor.

In addition, it may be provided that one plane of the housing region is arranged on the surface facing away from the housing interior outside the feedthrough opening above or below, with an offset to a plane which is formed by the surface of the conductor facing away from the housing interior. The offset describes the distance of the surface of the conductor, which is glazed into the feedthrough opening, from the surface of the upward drawn edge of the housing component and thereby the thickness of the necessary insulating glass layer, which is applied to the drawn-up edge, either directly or in the form of a separate insulating element.

The thickness of this insulating layer is preferably identical to the height of the offset and is in the range of 0.1 mm to 1.0 mm, preferably 0.1 mm to 0.7 mm, in particular 0.1 mm to 0.2 mm.

Preferred material for the conductor and/or the housing are metal, in particular iron, an iron alloy, an iron-nickel alloy, an iron-nickel-cobalt alloy, KOVAR, titanium, a titanium alloy, steel, stainless steel or high-grade steel, aluminum, an aluminum alloy, AlSiC, magnesium and a magnesium alloy. In particular high-grade steel and in this case ferritic high-grade steel are preferred due to the excellent adhesion of the glass or glass ceramic material. An additional advantage is that the coefficient of expansion a of the ferritic high-grade steel is in the range of 9 to 11 ppm/K which corresponds to the coefficients of expansion of the glass material which is being used.

If a cap-shaped element is used as the conductor in place of a solid pin, this has the advantage that, due to the comparatively thin side walls of the cap-shaped element, the combination of the cap-shaped element with the glass or glass ceramic material, is more resistant in regard to transverse loads, which occur in the event of thermal stresses, but also with compressive stresses inside the housing. The cap-shaped element can compensate for transverse loads due to its elasticity so that a pressure upon the glass or glass ceramic material and an associated failure of the sealing material is avoided. In addition, substantial material savings are achieved with such an arrangement compared to a solid pin. On the basis of the design as a cap-shaped element additional space is created in the housing, for example the battery housing. In particular, this makes larger surfaces of the cap-shaped conductor and thus of the connecting region possible and at the same time provides enlarged available assembly space. By using a cap-shaped element a higher thermal resistance is achieved in contrast to a design of a feedthrough with a solid pin. In addition, the housing assembly space is increased since conductor contacting can occur in the cap-shaped element. It is thus possible to achieve a higher battery output density at an increased overall volume with the same outside dimensions.

The cap-shaped element can in particular also be manufactured in the embodiment of a drawn component. The drawn component is preferably produced by deep drawing. Deep drawing is a tensile-compression forming process and a most important sheet metal forming process which is widely used in mass production. Deep drawing is achieved with the assistance of forming tools, impact devices and energy. The thereby produced cap-shaped element is especially advantageously a one-piece component.

Due to mass production the cap produced by deep drawing is especially cost effective, material saving and efficiently producible.

An especially compact housing for an electrical storage device is provided, if in a feedthrough the partial surface of the housing component, that is covered by an inorganic material, in particular a glass or glass ceramic material, has a wall thickness wherein the wall thickness is less than 1 mm, preferably less than 0.7 mm, in particular less than 0.5 mm and especially preferably less than 0.3 mm, in particular less than 0.2 mm, particularly preferably less than 0.1 mm. Especially preferred is a wall thickness in the range of 0.02 mm to 1 mm, in particular in the range of 0.02 mm to 0.1 mm.

In order to minimize the pressure on the side walls of the feedthrough having the thin wall thicknesses it is advantageously provided, that the housing component has a first coefficient of expansion $a_{housing}$, the conductor, in particular the metal pin, preferably the contact pin has a second coefficient of expansion $a_{pin}$ and the glass or glass ceramic material has a third coefficient of expansion $a_{glass}$ and that the difference of first, second and third coefficient of expansion is 2 ppm/K maximum, preferably 1 ppm/K maximum. In a case like this we have a matched feedthrough.

It is especially preferred if the first, second and third coefficients of expansion ($a_{pin}$, $a_{glass}$, $a_{housing}$) are in the range of 9 ppm/K to 11 ppm/K.

The glass or glass ceramic material can also include fillers, which serve in particular to control the thermal expansion of the glass or glass ceramic material, in order to achieve an especially well-matched feedthrough.

To provide a wall for the inorganic material, in particular the glass or glass ceramic material, the housing component is raised or lowered in the region of the feedthrough opening. In this manner, a wall is provided in the region of the feedthrough into which a conductor can be glazed.

To facilitate such a glazing it is provided that the housing component outside the raised or lowered region, or respectively the drawn-up or drawn down region, has a first plane. The raised or lowered region is located in a second plane, and that the first plane is angled toward the second plane, in particular vertically angled. With a vertical angulation, that is, the raised or lower region is positioned perpendicular on the first plane of the housing component, an especially stable glazing of the conductor is possible, since in this way, the contact surface between insulator and housing component is enlarged. By raising or lowering the housing cover with assistance of bending or reshaping of the thin housing material the necessary length is provided for reliable glazing. Glazing length EL is preferably 0.3 mm to 1.0 mm, preferably approximately 0.6 mm. The drawn-up or lowered region provides the edge for the collar of the feedthrough. In particular, the plane of the housing region is arranged on the surface facing away from the housing interior outside the feedthrough opening above or below, with an offset to the plane which is formed by the surface of the contact pin facing away from the housing interior, wherein the offset is no more than 1 mm, preferably no more than 0.7 mm, and is in particular in the range of 0.1 mm to 1 mm. Such an offset ensures on the one hand secure electrical insulating of the conductor from the metallic housing, and on the other hand a compact design. A short circuit is thus safely avoided, in particular if contacting occurs from the outside. A storage device with this type of feedthrough can moreover be designed to be very flat in spite of the necessary glazing length of, for example, approximately 0.6 mm.

By means of the glass or glass ceramic material, the conductor is inserted and hermetically sealed into the feedthrough opening. Hermetically sealed is understood to have a He leakage rate of $1*10^{-8}$ mbar l/s at a pressure difference of 1 bar.

To insulate, in particular electrically insulate the glazing opening, which is formed by the raised region, it is provided that the glass or glass ceramic material covers an end surface of the raised or lowered region. Instead of protruding glass material stemming from the glazing, a separate glass ring, that is an insulating element, can also be provided.

To improve the adhesion of the glass or glass ceramic material and to ensure in the case of swelling glass or glass ceramic material that same can expand it is provided that the raised or lowered housing component includes openings and/or recesses.

Whereas the openings also serve to tolerate an expansion of the glass material, the recesses serve to improve the glass adhesion. The recesses can be introduced into the metal in various ways. A pattern may be embossed into the metal prior to bending which provides the raised or lowered region and into which the conductor is then glazed. In particular the surface, which is in contact with the glass is being enlarged by introducing recesses, which improves the glass adhesion.

To provide even better interconnecting of the glass or glass ceramic material in the region of the feedthrough opening, provisions are made that the wall of the raised or lowered region includes openings and/or recesses with a diameter and that the diameter decreases or increases in the progression of the raised or lowered region. By such progression of the diameters of the openings, interconnection and thereby better glass adhesion is achieved.

To cover the partial surface of the housing, according to the invention, with the inorganic material, in particular the glass or glass ceramic material, in the region of the raised or lowered region, a swelling glass or glass ceramic is used. The swelling glass or glass ceramic includes pores in its volume area, in particular bubble-shaped pores. In its surface region the swelling glass may, in contrast, create an unbroken surface, in particular a glass or glass ceramic skin at the boundary surface with the air. The porous glass material is obtained by adding a certain amount of a gas, which dissolves in the glass which, however, is outgassed during heating of the glass, so that the pores remain in the glass.

The preferred glass or glass ceramic material is alumoborate glass with the following main components: $Al_2O_3$, $B_2O_3$, BaO and $SiO_2$. The coefficient of expansion of such a glass material is preferably in the range of 9.0 to 9.5 ppm/K or respectively 9.0 to 9.5 $10^{-6}$/K and thus in the range of the coefficient of expansion of the metal that the housing is made of and/or the metal pin. The aforementioned coefficient of expansion is especially advantageous in the use of high-grade steel, in particular ferritic or austenitic high-grade steel or Duplex high-grade steel. Because of a similar coefficient of expansion of the high-grade steel to that of the alumoborate glass, a matched feedthrough is provided in such a case.

It is especially preferred if the share of pores in the volume of the inorganic glass or glass ceramic material is in the range of 10 volume-% to 45 volume-%, preferably 18 volume-% to 42 volume-%. The share of pores prevent the glass material, which is inserted in the opening, from breaking under stress upon the glazed conductor, especially under compressive stress. Breaking of the glass under compressive stress is due to the fact that the glass adheres very well on the wall, which is created by the raised or lowered region. Part of the glass material then breaks out of the opening under compressive stress.

In order to reach good adhesion and/or impermeability the glass or glass ceramic material forms a glass-metal bond with the end face of the raised or lowered region of the housing region, the bond being free of pores, at least in the outside circumferential region of the raised or lowered region.

The surface of the glass or glass ceramic material is positioned advantageously on the surface facing away from the interior of the housing in a plane with the surface of the conductor. In order to securely hold the conductor in the glass material the conductor, in particular the metal pin, preferably the contact pin, in particular also the cap-shaped element, includes an indentation.

An even more secure retention of the conductor in the glass material is achieved when the raised or lowered region progresses in such a way that a constriction is created. The raised or lowered region of the housing part, in particular the battery cover, provides the necessary glazing length EL or H for glazing. To avoid breakage of the glass or glass ceramic material after glazing, for example due to temperature effects, it is advantageous if the raised or lowered region includes a flexible flange to connect the feedthrough with the housing, for example a battery housing. The flange itself includes a region, a so-called connecting region with which the feedthrough is connected to the housing part. Connection can occur by means of welding, in particular ultrasonic welding or soldering.

The connection between flange and battery housing is preferably impermeable, that is, the He leakage rate is less than $1.10^{-8}$ mbar l/s at 1 bar pressure difference.

Besides the feedthrough the invention also provides an electrical storage device, in particular a battery or capacitor, having at least one feedthrough according to the present invention. As already described, the invention also includes in particular a micro-battery.

Especially compact electrical storage devices are provided if the electrical storage device having a total height not exceeding 5 mm, in particular not exceeding 4 mm, preferably not exceeding 3 mm, in particular in the range of 1 mm to 5 mm, preferably 1 mm to 3 mm.

It is especially preferred if the material of the storage device—at least for the housing region which is in contact with the inorganic material, in particular the glass or glass ceramic material—is a metal, in particular iron, an iron alloy, an iron-nickel alloy, an iron-nickel-cobalt alloy, Kovar, steel, stainless steel, high-grade steel, ferritic high-grade steel, aluminum, an aluminum alloy, AlSiC, magnesium, a magnesium alloy, titanium or a titanium alloy. In addition to the ferritic high-grade steel, KOVAR is also a possible material for a feedthrough according to the invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
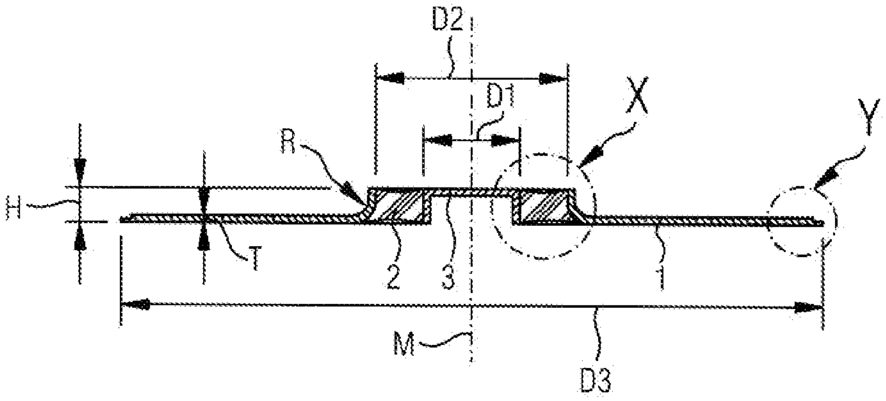
FIG. 1 illustrates a cross section through a housing part, in particular a battery cover with an embodiment of a feedthrough according to the present invention, with a cap-shaped element as the conductor.

Referring now to the drawings, and more particularly to FIG. 1 there is shown a sectional depiction of a feedthrough according to the present invention for a storage device, in particular an electrical storage device. The housing part, in particular the cover, preferably the battery cover is identified with reference number 1. Battery cover 1 having a width of D3 is reshaped or respectively drawn upward, so that an opening with an edge is created. A glass or glass ceramic material, reference number 2, is inserted into the opening with the edge. Thickness T of the battery cover is preferably only 0.1 mm to 0.3 mm. The drawn-up edge with radius R provides a suitable glazing length, in spite of the possible low material thickness of cover 1. Cover 1 of a capacitor can be designed essentially the same or at least very similar. The presence of a radius contributes to the mechanical stability and reliability of the housing part—in particular in the case of thin material thicknesses—because formation of cracks in the material is thereby suppressed. According to FIG. 1, radius R is positioned on the top and bottom side of the drawn-up edge. In other drawings radius R is only on one side, in particular the top side. The drawings are exemplary, and the teaching science of the invention is interchangeable between the drawings. This means that the embodiments with the radii on either the top or bottom sides can also be designed such, that radii are present on the top and bottom side.

The substantially circular opening with an edge has a diameter which is identified with D2 in FIG. 1. For one thing, the glass or glass ceramic material is inserted into the opening with diameter D2, and secondly, a conductor, in a first embodiment preferably a cap-shaped element which is identified with reference number 3. Cap-shaped element 3 is inserted in the glass material and is preferably an element obtained by deep drawing. The material of element 3 is preferably a nickel-iron alloy, in particular a nickel-iron-cobalt alloy.

Like the opening, cap-shaped element 3 in this embodiment is also essentially round and has a diameter D1. As shown in FIG. 1, cap-shaped element 3 has thin side walls 10 (see FIG. 2) with a thickness in the range of, for example 0.1 mm to 0.3 mm and has a hollow space in the cap which normally faces the interior of the housing. The side walls 10 of cap-shaped element 3 and the connecting surface preferably have the substantially same material thickness as cover 1.

Thin side walls 10 of cap-shaped element 3 whose thickness is coordinated with the thickness of cover 1—preferably a thickness in the range of 0.1 to 0.3 mm—have the advantage that, in contrast to solid pins, they can absorb mechanical transverse loads which occur under thermal stresses. Thus, in contrast to a solid pin the comparatively thin metal yields under transverse loads, especially advantageously in a flexibly resilient manner, whereas a solid pin presses onto the glass where it can result in damage. Another reduction in the load upon the glass is preferably achieved in that all components, namely the housing part with the opening, the glass material and the cap-shaped element 3 have substantially the same thermal coefficient of expansion, namely in the range of 3 to $7*10^{-6}$ 1/K.

Preferred materials for cap 3 are KOVAR, nickel-iron-cobalt alloys but also iron, iron alloys, iron-nickel alloys, iron-nickel-cobalt alloys, titanium, titanium alloys, steel, stainless steel, high-grade steel, magnesium, magnesium alloys, aluminum, aluminum alloys, or AlSiC.

Also clearly shown in FIG. 1 is the hollow space in cap 3 according to the invention. The hollow space in cap 3 can serve to accommodate various safety devices, for example temperature and/or pressure gauges. With the inventive solution, these can be effectively integrated into the housing. It is preferred if cap 3 is provided with its described base stamping by means of which the pressure release, in the event of a stress situation, can be realized, in particular in the case of battery failure.

It is especially preferred if contacting of a conductor occurs in the interior of the housing with cap 3 via tongues, which are two-dimensionally connected in particular with cap 3 in the region of the hollow space of cap 3. Contacting by means of tongues has the advantage over contacting by means of a pin, in that the contact areas are larger, along with which there is a lesser contact resistance. The connection with tongues can furthermore be permanently more resistant to shear stresses.

In the illustrated embodiment cap 3 is preferably round with a diameter D1. Diameter D1 of cap 3 is in the range of, for example 1.5 mm to 5 mm, and preferably between 2.0 mm and 4.0 mm. Exemplary diameter D2 of the opening is substantially larger and is in the range of between 8 mm and 4.0 mm, in particular around 5 mm. Glazing length H of the inventive cap 3 in the opening is preferably between 0.4 mm and 1 mm, preferably 0.6 mm. All stated dimensions are exemplary and do not represent a limitation.

Figure 2:
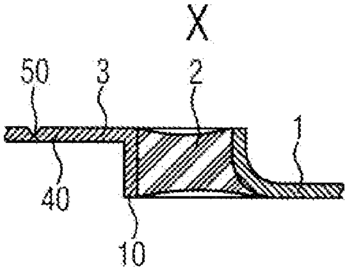
FIG. 2 shows further detail of the feedthrough according to the present invention in an area noted as section X of FIG. 1.

FIG. 2 is a section X from FIG. 1, here in the embodiment with a base stamping 50. Clearly recognizable are bent cover 1 which leads to the opening with the edge and provides the glazing length H, inventive cap 3 as well as glass or glass ceramic material 2. All three components together create a so-called matched feedthrough, wherein the thermal coefficient of expansion of the housing part 1 as well as that of the glass and/or glass ceramic material 2 and cap 3 is substantially the same.

Also shown in FIG. 2 base stamping 50 is introduced into metal 40 of cap 3. The strength, or respectively thickness of cap-shaped element 3 is in the range of 0.1 to 0.3 in this embodiment.

The material thickness in the region of stamping 50 is greatly reduced and is preferably in the μm range, depending on the requirements regarding at what pressure a pressure release is to occur. Exemplary material strengths, that is the thicknesses of the metal 40 in the region of stamping 50 are in the range of 10 μm to 50 μm as used in this embodiment, however, without restriction thereto. The material thicknesses in the region of stamping 50 are thus the remaining material thicknesses.

Figure 3:
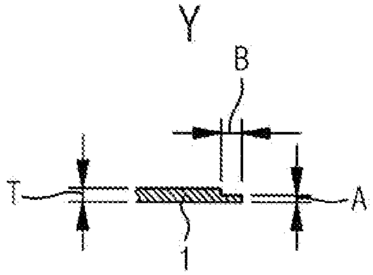
FIG. 3 illustrated further detail of part of the battery cover of FIG. 1 in an area noted as section Y in FIG. 1.

FIG. 3 illustrates detail Y of cover 1 from FIG. 1. Exemplary cover 1 has a gradation with which it can be welded or soldered onto other housing parts. Such a gradation is advantageous, however not necessary. Designs without gradation are also conceivable. By means of welding or soldering the feedthrough is connected with the rest of the housing of the electrical device, in particular the storage device in a hermetically sealed manner, that is with the He leakage rate of less than $1 \cdot 10^{-8}$ mbar l/s at 1 bar pressure difference.

Figure 4:
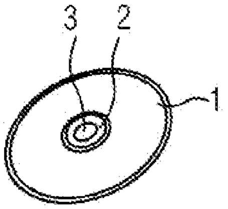
FIG. 4 is a perspective top view onto a feedthrough according to the present invention used in the battery cover of FIG. 1.

FIG. 4 is a perspective view of the inventive feedthrough having a round outer shape. Same components as in FIGS. 1 to 3 are identified with the same reference numbers. FIG. 4 shows the entire cover 1 with cap 3 in a glass material 2.

Figure 5:
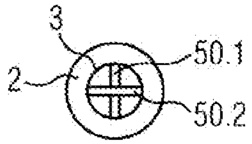
FIG. 5 is a top view of the feedthrough of FIG. 1 with two intersecting stampings.

FIG. 5 is a top view of inventive cap 3 in a glass material 2. Same components are again identified with the same reference numbers. The two base stampings 50.1, 50.2 which are introduced into the metal can be clearly seen in FIG. 5. Base stampings 50.1, 50.2 progress over the entire diameter of cap 3. The example—without limitation thereto—shows two base stampings 50.1, 50.2 which intersect at right angles, in particular in a cross-like manner.

Figure 6:
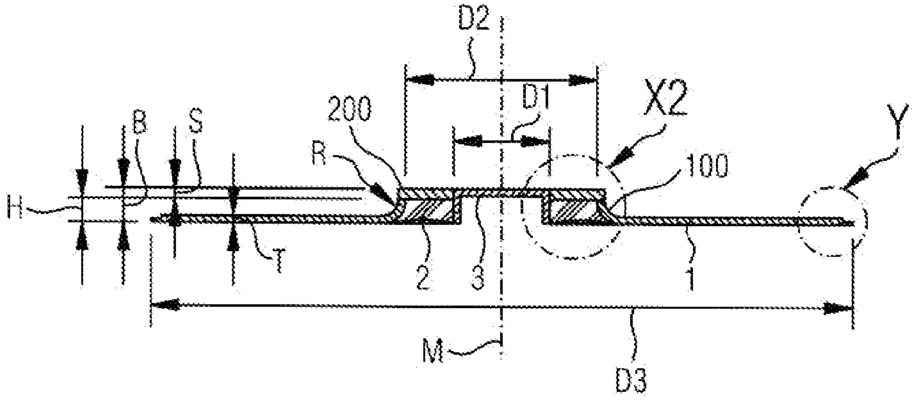
FIG. 6 is a cross sectional view through a housing part, in particular a battery cover with another embodiment of a feedthrough according to the present invention and an insulating element, covering the front face of the collar.

FIG. 6 shows an alternative arrangement of the embodiment of a feedthrough according to FIG. 1. In the arrangement according to FIG. 6 an insulating element 200 is provided which covers the drawn-up edge which creates a collar 100. Collar 100 is created by pulling upward, that is reshaping of the thin housing part, in particular the battery cover 1. If collar 100 is created by reshaping the thin housing part 1, then the collar is generally one piece. Material thickness T of housing part 1 is preferably between 0.1 mm to 0.3 mm. The glazing length provided by the drawn-up region with a height H which is identified in FIG. 8 with EL is between 0.3 mm and 1 mm in the illustrated embodiment. Thickness S of the insulating element can for example be 0.1 mm to 0.5 mm but can be selected according to the application. As insulating material a plastic material or a glass or glass ceramic material can be used. Height B is equal to height H of the drawn-up region and thickness S of the insulating element. The diameter of the opening into which the conductor or respectively cap-shaped element 3 is inserted or respectively glazed is D2. The diameter of cap-shaped element 3 is D1.

Figure 7:
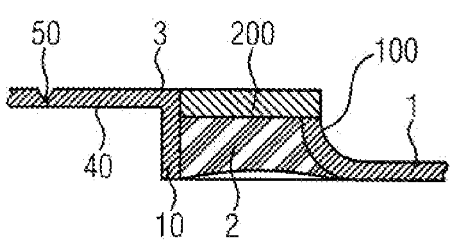
FIG. 7 is a detail view of the feedthrough of FIG. 6 focusing on area X2 identified in FIG. 6 with the insulating element shown in part.

Insulating material 200 consisting in particular of plastic or glass or ceramic is arranged on glass or glass ceramic material 2 and covers in particular the front face of collar 100 or respectively of the drawn-up region. The collar is thus electrically insulated from the conductor 3. The plane of the surface of collar 100 is preferably located below the plane of the surface of contact element 3 or respectively conductor 3. It is especially preferred if the surface of insulating element 200 is located in one plane with the surface of the contact element or respectively the conductor, in this case cap-shaped element 3. FIG. 7 shows a detailed view of FIG. 6 according to detail X2. Same components as in FIG. 6 are assigned the same reference numbers. Insulating element 200 which insulates the protruding collar and thereby the housing component safely from the conductor is clearly recognizable in FIG. 7.

Figure 8:
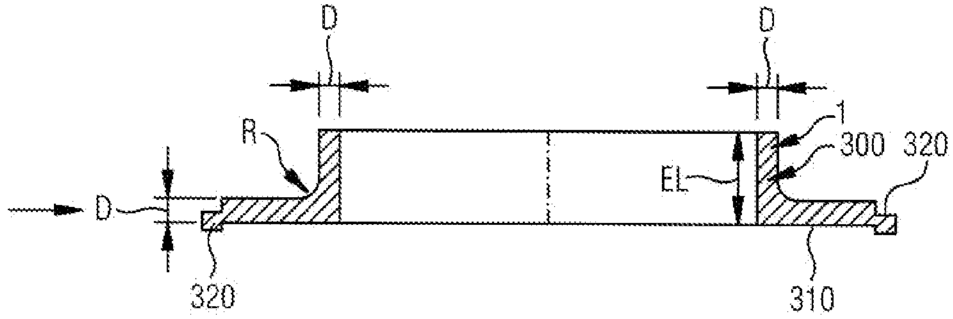
FIG. 8 is a cross sectional view through a housing part of the battery cover of FIGS. 1 and 6, in particular a battery cover with a raised edge and an altered thickness in a connecting region due to the offset.

FIG. 8 shows a housing part 1 with a drawn-up edge 300 which provides a glazing length EL. Edge 300 forms a collar. Glazing length EL is preferably between 0.3 mm and 1 mm. Thickness D of the bent metal which provides the collar, or drawn-up edge is in this case for example in the range of 0.1 mm to 0.3 mm. Housing part 1 moreover includes a flange 310 with which the housing part 1, in particular the cover 1 including the feedthrough is being connected with another part of the housing, for example by means of welding. To provide a tight connection between the housing part 1 in the form of a feedthrough and the rest of the housing it is provided in the embodiment shown in FIG. 8 that, at the end of flange 310 in region 320 the material is not stamped, but is offset to a thickness of 0.15 mm. Since the material in the region in which it is connected with the rest of the housing, for example by means of laser welding, is in fact changed in its thickness by offsetting but not weakened, cracks in the glass can be avoided and a tight connection of housing part 1 with the feedthrough in the housing, for example the battery cover can be provided. “Tight” in the current example means the He leakage rate is less than 1.10-8 mbar l/s at 1 bar pressure difference. In order to avoid tearing of the offset region provision can be made to provide the offset region with a radius R which can advantageously be at least 0.05 mm.

Figure 9:
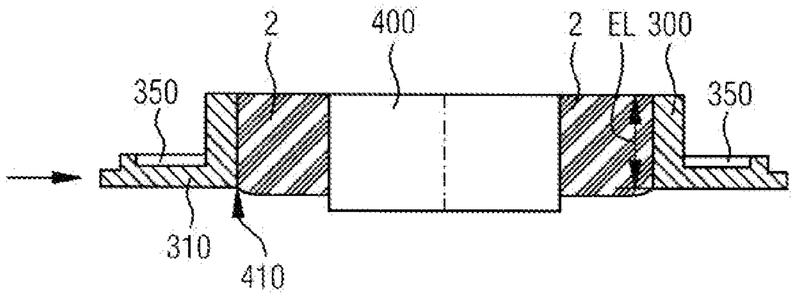
FIG. 9 is a cross sectional view through a housing part of the battery cover of FIGS. 1 and/or 6 with a raised edge and a flange with a reduced flange thickness.

FIG. 9 illustrates an alternative arrangement of a housing part 1 with drawn-up edge 300 and flange 310. Same components as in FIG. 8 are identified with the same reference numbers. Drawn-up edge 300 provides a glazing length EL. In the arrangement according to FIG. 7 a solid conductor 400 in a glass material 2 instead of a cap-shaped element 3 is glazed into opening 410 with drawn-up edge 300 of the housing component over length E.

Instead of solid conductor 400 a cap-shaped element, as shown in FIGS. 1 to 7, with the therein described advantages can of course also be glazed. The arrangement according to FIG. 9 also includes a flange 310 which serves to connect the feedthrough or respectively the housing component with the feedthrough with the housing of, for example, a storage device, for example by means of laser welding. In order to improve the permeability in a connection of the housing component or respectively of the feedthrough with the rest of the battery housing it is provided the reduce the thickness of flange 310 in region 350—for example by means of embossing—from 0.2 mm to 0.15 mm or 0.1 mm.

The flange is hereby reduced in its thickness, in other words made thinner and has then better elasticity in particular for laser welding, which again provides better impermeability.

Figure 10:
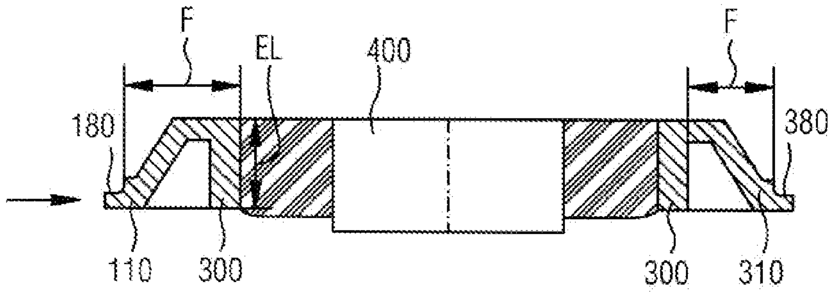
FIG. 10 is a cross sectional view through a housing part of the battery cover of FIGS. 1 and/or 6 with a raised edge and a flexible flange.

An arrangement is shown in FIG. 10 where flange 310 of the feedthrough for an electrical storage device is a flexible flange. Flange 310 includes a connecting region 380 which serves to connect the feedthrough with conductor 400 glazed into the glass or glass ceramic material 2 with a housing, for example a housing of a storage device. The connection of the feedthrough with the housing can occur through welding, in particular laser welding, but also soldering. The connection is made so that the He leakage rate is less than $1 \cdot 10^{-8}$ mbar l/s at 1 bar pressure difference. This makes the He leakage rate identical to that for the glazed conductor and a hermetically sealed housing for a storage device, in particular a battery is provided. On account of free space F between the drawn-up region, that is edge 300 which provides glazing length EL and connecting region 380, pressures acting upon the glass can be reliable compensated for. The flexibility of flange 310 prevents for example the breaking of the glass during temperature fluctuations.

In particular, any tensile or compressive stress, which occurs, for example with laser welding, is avoided due to the flexibility of flange 310. Thus, tensile and compressive tensions can be deflected from the welded cap to the ring. Same components as in FIGS. 8 and 9 are identified with the same reference numbers. In all arrangements of a feedthrough according to FIGS. 8 to 10 no glass material protruding over the edge of the drawn-up region is provided for insulation of the housing and the conductor which is fed through the housing component in the feedthrough. In such an arrangement an electrical insulation can be provided by introducing an additional insulating material, as shown in FIG. 6 and FIG. 7.

Figure 11:
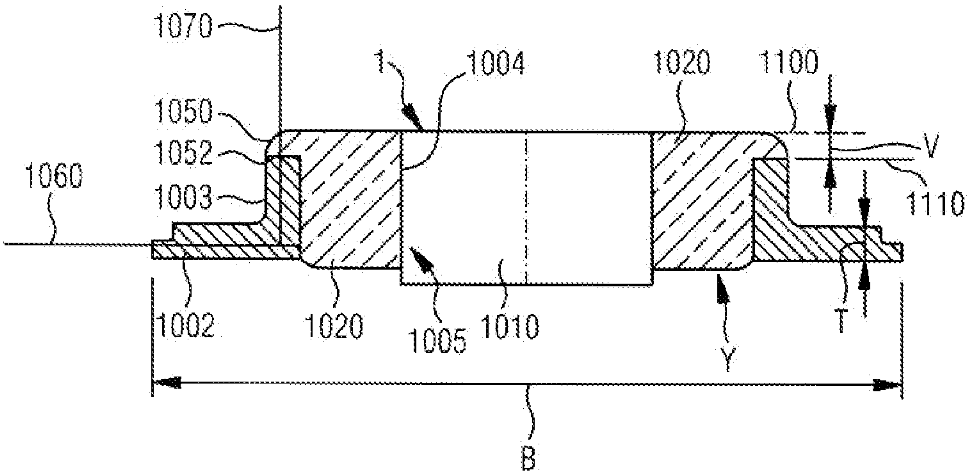
FIG. 11 is a cross sectional view through a housing part of the battery cover of FIGS. 1 and/or 6 with a feedthrough, wherein protruding glass material serves as insulating material.

FIG. 11 shows a cross sectional view of an alternative arrangement of a feedthrough 1 for an electrical storage device. Housing component 1002 through which the feedthrough leads is in particular a part of a housing for an electrical storage device, in particular a battery cover. This housing part is identified with reference number 1002. In the illustrated embodiment housing part 1002, in particular the battery cover is obtained by a reshaping process and has a width B. The housing part in this example has a drawn-up region 1003, in other words, the battery cover is raised or drawn upward, so that a wall 1004 is created in the region of feedthrough opening 1005. The raised region is also referred to as a collar. Instead of the raised region a lowered region of the housing component in the region of feedthrough opening would also be possible in order to provide wall 1004 with a corresponding glazing length EL or H in the region of the opening. Reshaping, or respectively raising or lowering of the housing component or battery cover in the region of feedthrough opening 1005 is important in the current example, because thickness T of the housing component or respectively the battery cover is very thin. Wall thickness T of the housing component or respectively the battery cover is preferably less than 1 mm, preferably less than 0.7 mm, in particular less than 0.5 mm, especially preferably less than 0.3 mm, in particular less than 0.2 mm, particularly preferably less than 0.1 mm. To provide sufficient stability of the housing component it is necessary to provide a minimum thickness of 0.02 mm. An especially preferred range which on the one hand has the necessary stability, on the other hand provides a housing or housing component with relatively small dimensions which in turn results in a compact storage housing, is in a thickness range of 0.02 mm to 1 mm, preferably 0.02 mm to 0.1 mm. Such a thickness for the housing component is however not sufficient for glazing. To provide the necessary glazing length EL or H, raised or lowered regions of the metal which form the housing component, for example the battery cover, are necessary. For this purpose, the thin metal is bent upward or downward or respectively reshaped, resulting in raised or lowered region 1003 which is also referred to as a collar.

In contrast to a solid plate as used in the current state of the art which, based on its thickness provides the necessary glazing length, an especially thin and thus compact housing part with a feedthrough opening having a sufficient glazing length EL or H of preferably 0.3 mm to 1 mm, preferably approximately 0.6 mm is provided with the inventive arrangement with a relatively thin housing component and raised or lowered regions which are for example created by reshaping. The diameter of opening 1005 is between 2 mm and 5 mm, in particular 2.5 mm to 4 mm.

In addition, also illustrated in the drawing is metal pin 1010 which is inserted in feedthrough opening 1005 and which, in the current example is in the embodiment of a solid pin. Instead of solid metal pin 1010, the conductor may also consist of a cap-shaped element (not illustrated). The cap-shaped element compared to the solid metal pin has the advantage that it is also manufactured from a comparatively thin metal which yields in the event of a transverse load, especially advantageously in a flexibly resilient manner, whereas, in contrast a solid metal pin presses on the glass where it can cause damage.

The invention provides that the conductor, in particular metal pin 1010 is glazed into the feedthrough opening which is created by the raised or lowered region 1003 of the metal, preferably in an inorganic material, in particular in a glass or a glass ceramic material. The glass or glass ceramic material of the glazing is identified with reference number 1020 in the current example. According to the present invention it is provided that the inorganic material, in particular the glass or glass ceramic material covers a partial area of the housing component outside wall 1004, which supports the glazing. This protruding section of the glass that covers the housing component or respectively the battery cover is identified in the current example with reference number 1050. The fact that the glazing covers end 1052 of the raised region with a glass or glass ceramic material ensures that metal pin 1010 is electrically insulated from the housing component that is also made of metal. Instead of the glass material protruding over the edge of the raised region, an insulation can also be provided by a separate insulating material, as shown in FIG. 6 and FIG. 7. In contrast to housing component 1002 which is covered by glass or respectively glass ceramic material 1020 in order to provide an electrical insulation, the conductor, in particular the metal pin or the cap-shaped element is not covered by glass and is merely on a plane with the glazing in order to provide sufficient contact. As shown in FIG. 11 an offset V exists between planes 1100 in which the end of metal pin 1010 comes to rest and plane 1110 in which upper end 1052 of the raised region is located. The offset measures no more than 1 mm, preferably no more than 0.7 mm to 1 mm. The height of the offset also determines thickness D of glass cover 1050 which covers the raised region 1052 and ensures electrical insulation.

The glass that is used is a swelling glass with a share of bubbles or pores in the glass. This applies especially to the volume range. The share of bubbles or respectively a pore share is preferably 18 to 42 weight percent. To create the bubbles or respectively pores 1101, gas is added to the glass, which is outgassed again during melting and results in pores 1101. The glass ceramic material is alumoborate glass with the following main components: $Al_2O_3$, $B_2O_3$, BaO and $SiO_2$. The coefficient of expansion of the glass material is in the range $a_{glass}$ of 9.0 to $9.5*10^{-6}$/K.

The preferred materials for the housing component as well as for the conductor in the embodiment of a metal pin are iron, an iron alloy, an iron-nickel alloy, an iron-nickel-cobalt alloy, Kovar, steel, stainless steel, high-grade steel, aluminum, an aluminum alloy, AlSiC, magnesium, a magnesium alloy, titanium or a titanium alloy. It is especially preferred if the material of the housing component, as well as of the conductor, is a high-grade steel, in particular an alloyed high-grade steel according to EN 10020, preferably a high-grade steel containing chromium, in particular a high-grade steel selected from the group of ferritic high-grade steels and/or hardened high-grade steels. It is especially preferred if AISI446 or AISI430 are used as the ferritic high-grade steel materials. The metal pins used as the conductor are made of a ferritic high-grade steel and can be furnished with a nickel and/or gold cover, so that easy contacting is provided. The chromium content of the ferritic high-grade steels is in the range of 10 weight percent chromium to 30 weight percent chromium. The thermal coefficient of expansion is preferably in the range of 9.0 to 10.0 ppm/K, for example for high-grade steel AISI443 at $9.9*10^{-6}$/K.

Based on the thin component thickness of the component housing, it is preferred that the feedthrough is not a compression seal with different coefficients of expansion for the pin material, the glass material and the housing material, but that the coefficients of expansion are substantially the same and that the feedthrough is a matched feedthrough. This means that $a_{glass}$ $a_{pin}$ $a_{housing}$ show a difference in their coefficients of expansion which is maximally 2 ppm/K, preferably maximally 1 ppm/K. Based on the coefficient of expansion for the pin material $a_{pin}$ of 9.9 ppm/K or respectively $9.9*10^{-6}$/K for ferritic high-grade steel AISI443 it is advantageous if the alumoborate glass has a coefficient of expansion of 9.1 ppm/K or respectively $9.1*10^{-6}$/K. The thin housing material is selected in regard to the coefficient of expansion to be approximately the same as that of the glass and material of the conductor. The material of the housing component is preferably also a ferritic high-grade steel, for example AISI443. However, the material of the housing is in no way restricted thereto. Other materials as specified in the application are also possible if the coefficient of expansion does not differ greatly from that of the glass and conductor material.

As illustrated in FIG. 11, the housing component is arranged outside the raised or lowered region in a first plane 1060, and the raised or lowered region in a second plane 1070. In the illustrated embodiment first plane 1060 is angled relative to second plane 1070. In the illustrated embodiment first and second plane 1060, 1070 are arranged substantially vertical on top of one another however, this does not necessarily have to be the case. It is also possible that the raised or lowered region are not arranged completely vertical on top of another, but at an angle of 80° and thus slightly tilted so that a conical progression of wall 1004 of feedthrough opening exists which results in a constriction of the feedthrough opening, resulting in improved adhesion of the glass or glass ceramic material.

To improve adhesion for the glass material in feedthrough opening 1005 provision can be made that the material, in particular the metal that provides the inside wall of the feedthrough opening includes recesses and/or openings, as illustrated in FIGS. 13*a*-13*d*. To create space for the swelling glass material which will be inserted into the feedthrough opening provision can be made that the raised or lowered region is equipped not only with recesses but also with lateral openings. In addition to providing space for the swelling glass material said lateral openings also lead to improved glass adhesion. If the interconnection of the glass material is to be further improved, it is provided that the lateral openings in the raised or lowered region have different diameters, wherein the diameters become smaller in the progression of the raised region.

An additional improvement in the adhesion can be achieved if the conductor, in particular the metal pin, preferably the contact pin, but also the cap-shaped element has an indentation which is not illustrated in the current example. Whereas the glass has a share of 18-42% of pores in the feedthrough opening, the glass or glass ceramic material is largely pore-free at the faces 1052 of the raised or lowered region which identified with 1003. The glass or glass ceramic material which has pores 1101 in the volume region thus forms a pore-free unbroken surface in its surface area, in particular a glass or glass ceramic skin which coats the housing component in particular on the boundary surface to the air.

Figure 12:
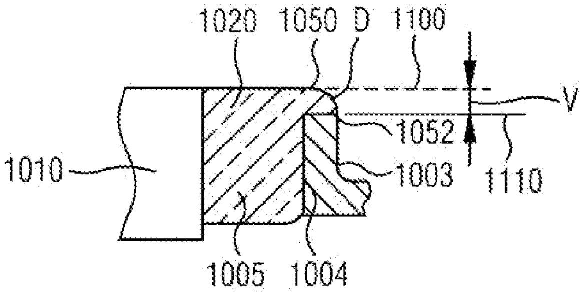
FIG. 12 illustrates further detail of the feedthrough of FIG. 11 associated with section Y of FIG. 11.

FIG. 12 is a detailed illustration of the region of the edge or respectively end 1052 of the raised region in FIG. 11, in particular the drawn-up region of the metal, wall 1004 for the feedthrough opening 1005 and a collar, as well as glass material 1020 which covers the upper region or respectively upper end 1052 of drawn-up region 1003 in the form of a glass skin and thus provides for sufficient electrical insulation of metal pin 1010. Clearly visible is offset V which denotes the height difference of plane 1100 in which metal pin 1010 comes to rest and plane 1110 in which the end of the protruding region is located. The offset which is in the range of 0.1 mm to 1 mm also determines the thickness of glass layer 1050 which covers the protruding region and provides the electrical insulation. Same components as in FIG. 11 are identified with the same reference numbers in FIG. 12.

Figure 13A:
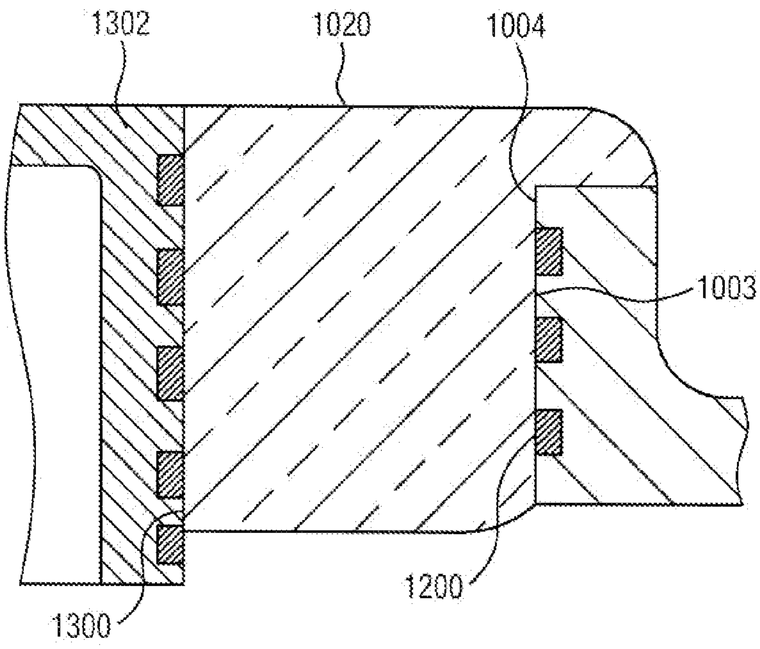
FIG. 13*a* illustrates one type of the proposed recesses on the wall of the raised or lowered region and/or on the glazed conductor of the feedthrough of FIGS. 1 and/or 6.

FIGS. 13*a*-13*d* show different types of recesses on the interior wall of the drawn-up housing component and/or the glazed metal pin or respectively the cap-shaped element. FIG. 13*a* shows in principle detail Y from FIG. 11, wherein recesses 1200 are introduced into inside wall 1004 of drawn-up region 1003 as well as into cap wall 1300. The recesses serve to improve adhesion and according to FIG. 13*a* are introduced into the metal of inside wall 1004 as also of cap 1302 by means of stamping prior to the reshaping process, for example drawing.

Figure 13B:
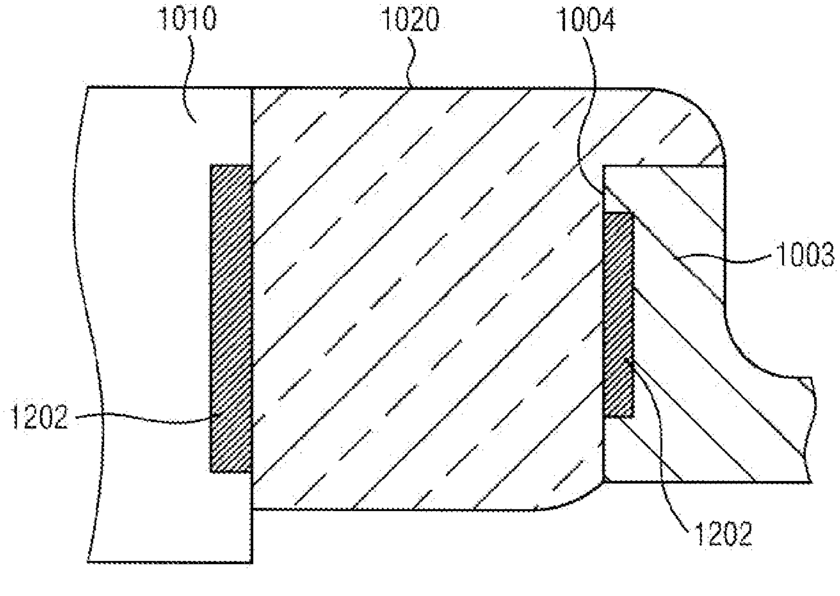
FIG. 13*b* illustrates another type of the proposed recesses on the wall of the raised or lowered region and/or on the glazed conductor of the feedthrough of FIGS. 1 and/or 6.

FIG. 13*b* shows a variation of the invention. Same components as in FIG. 13*a* are identified with the same reference numbers. In the embodiment according to FIG. 13*b* the conductor is not designed as a cap-shaped element as in FIG. 13*a*, but instead as a metal pin 1010 made a solid material. In the embodiment according to FIG. 13*b* recess 1202 is introduced into the inside wall of the drawn-up region 1003 the same way as there is a recess 1202 in the wall of metal pin 1010 consisting of solid material facing glass material 1020.

Figure 13C:
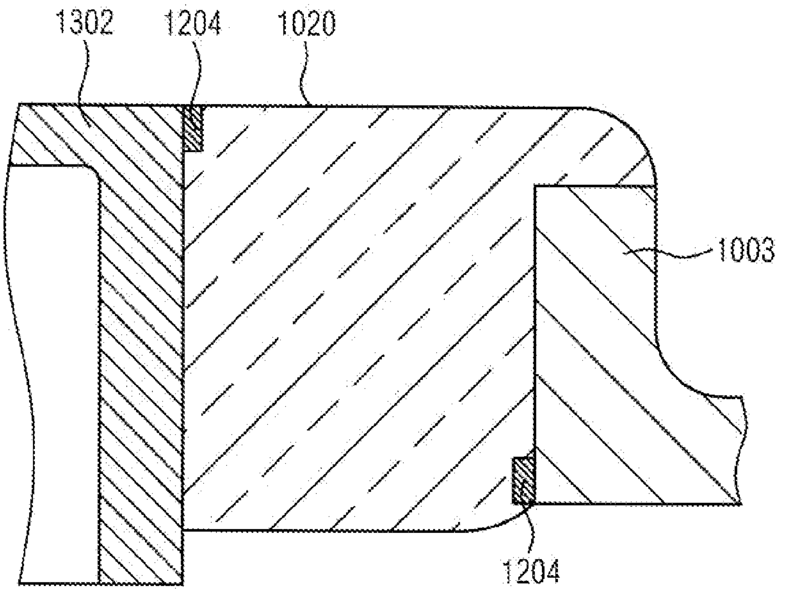
FIG. 13*c* illustrates yet another type of the proposed recesses on the wall of the raised or lowered region and/or on the glazed conductor of the feedthrough of FIGS. 1 and/or 6.

FIG. 13*c* shows a third variation to introduce the recesses. The conductor in FIG. 13*c* is a cap-shaped element 1302 as per FIG. 13*a*. Recesses 1204 were introduced by means of compression, preferably penetration during the reshaping process for the drawn-up region 1003 of the component as well as into cap-shaped element 1302. Recesses 1204 can be indentations or convexities. In the current example the recesses are illustrated as convexities.

Figure 13D:
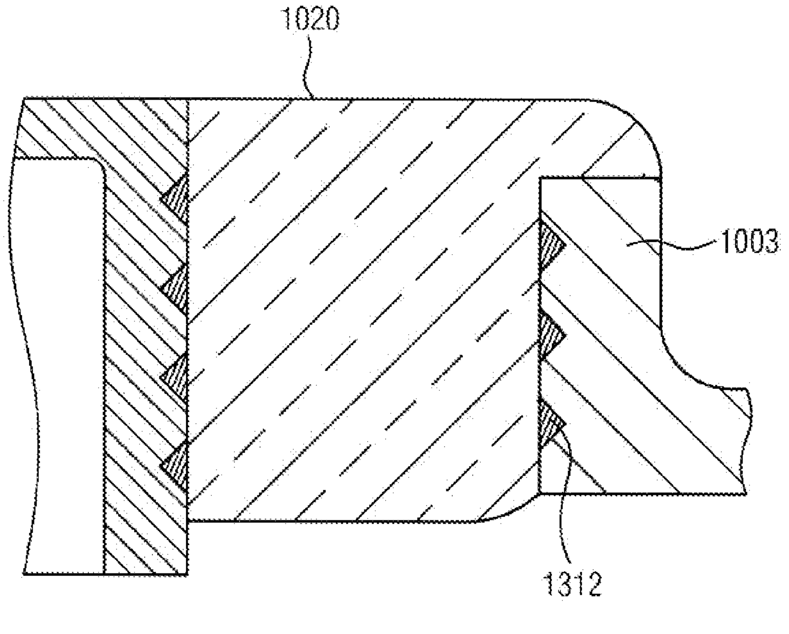
FIG. 13*d* illustrates still yet another type of the proposed recesses on the wall of the raised or lowered region and/or on the glazed conductor of the feedthrough of FIGS. 1 and/or 6.

FIG. 13*d* shows an additional variation for introducing the recesses. In the variation according to FIG. 13*d* a fluting 1312 with various patterns is introduced—preferably by stamping of the metal—into inside wall 1004 of raised region 1003 as well as onto cap-shaped element 1302. Same components as in the previous drawings are identified with the same reference numbers.

Figure 14:
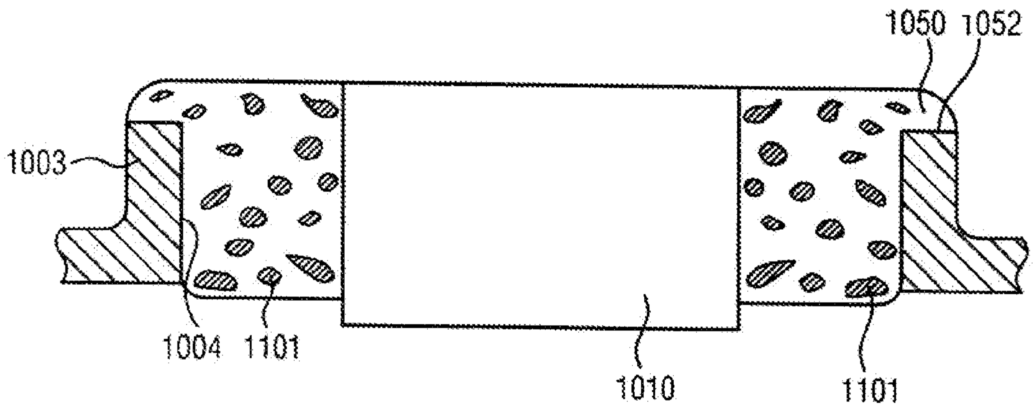
FIG. 14 illustrates a section in the region of the glazing with a glass and/or glass ceramic material in the feedthrough of FIGS. 1 and/or 6.

FIG. 14 shows a cut through view of an inventive component in the region of the glazing. The reference numbers are taken from FIGS. 11 and 12. Clearly visible are pores 1101 in the volume of glass material 1004. Also shown is raised region 1003 of the housing component. As can be seen in FIG. 14, glass material 1050 coats an upper end or respectively an end face 1052 of raised region 1003. In contrast to the volume of the glass material with pores 1101, the glass material at the interface with the air indicates no presence of pores 1101. Instead, a pore-free glass film or respectively glass skin is formed. From FIG. 14 it is also evident that the glass skin does not necessarily need to develop at the interface to the metal. Surprisingly, in spite of this, a hermetically sealed feedthrough is achieved. It can be assumed that at least the glass skin at the interface to the air is an effective barrier. Naturally, the invention also provides glazing variations where a glass skin is also formed at the interface with the metal.

Figure 15:
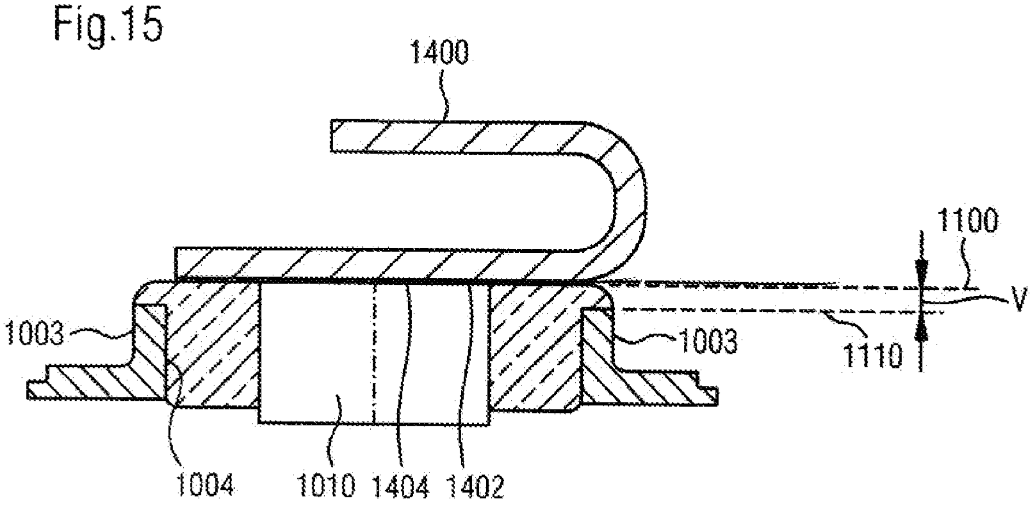
FIG. 15 is a cross sectional view through a housing part according to FIG. 11 with a contact device, in particular a contact flag being illustrated.
Figure 17:
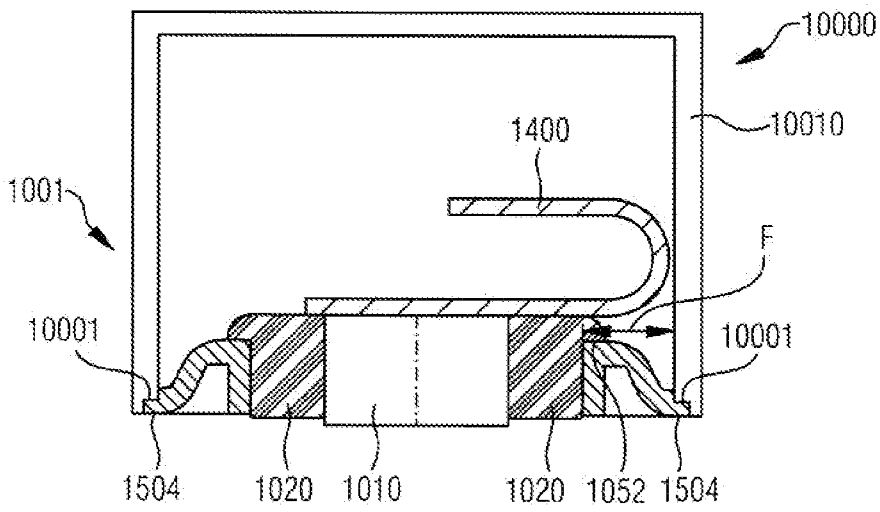
FIG. 17 illustrates a micro-battery with a feedthrough according to at least one of the previous figures of the present invention.

FIG. 15 shows the feedthrough according to FIG. 11 or 12, wherein with the conductor or respectively with metal pin 1010 a contact device, in this example a contact flag 1400 is electrically and mechanically connected. The electrical connection occurs with conductor 1010 in the embodiment of a metal pin on top side 1402 by flat contact of inside 1404 of contact flag 1400. Based on offset V of surface 1100 of top side 1402 of the metal pin and the surface or respectively plane 1110 of top side 1052 of raised region 1003, glass material can cover end 1050 or respectively the surface of the raised region in said thickness, so that an electrical insulation from drawn-up component 1003—in this example consisting of ferritic high-grade steel—and contact flag 1400 consisting of a metal is achieved. The glass material, in particular the swelling glass material enters the gap between the raised region and the contact flag and ensures electrical insulation of the contact flag which can be connected to other electrical consumers or devices, in particular to the battery interior, as shown in FIG. 17, and the housing. The electrical insulation could also be achieved through a separate insulating element, as shown in FIGS. 6 and 7.

Figure 16:
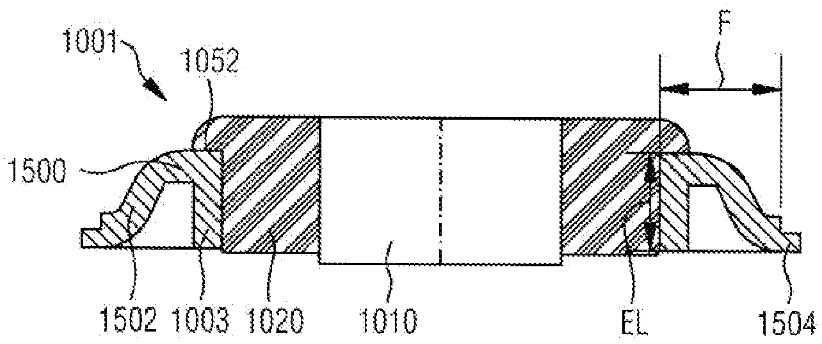
FIG. 16 is a cross sectional view through a housing part according to FIG. 11 with a flexible flange.

An embodiment is shown in FIG. 16, wherein flange 1500 of feedthrough 1001 is a flexible flange 1500. Flange 1500 includes a connecting region 1502 which serves to connect feedthrough 1001 together with conductor 1010 which is glazed into glass or glass ceramic material 20 with a housing, for example a housing of a storage device. Connection of the feedthrough with the housing can occur by means of welding, in particular laser welding, but also soldering. The connection is made so that the He leakage rate is less than $1 \cdot 10^{-8}$ mbar l/s at 1 bar pressure difference. This makes the He leakage rate identical to that for the glazed conductor, and a hermetically sealed housing for a storage device, in particular a battery is provided. On account of free space F between the raised or lowered region 1003 which provides glazing length EL or respectively H and connecting region 1502 pressures acting upon the glass can be reliable compensated for. The flexibility of the flange as shown in FIG. 16 prevents, for example, the breaking of the glass during temperature fluctuations. Therefore, tensile and compressive stresses which occur, for example, during laser welding can be securely avoided. Laser welding of the illustrated housing component with the remaining housing occurs at tip 1504 of flexible flange 1502. The thickness of the flange is weakened in the region of tip 1504 and is only 0.15 mm. Flange 1502 of the feedthrough which is weakened in the region of tip 1504 can be connected directly with the remaining housing of the electrical storage device by means of laser welding, resulting in an electrical storage device with a feedthrough 1001 as described in FIG. 16. Because the feedthrough is very compact due to the very thin material thickness of the housing part or respectively the battery cover of only 0.1 mm to 1 mm, a very compact storage device, in particular a micro-battery can be provided by means of installation of such a feedthrough into a battery housing—for example by means of a welding connection in the region of tip 1504 of the feedthrough with the remaining storage device housing.

In FIG. 17 an inventive electrical device, in particular a micro-battery with an inventive feedthrough is shown. The electrical device or respectively the micro-battery is identified with 10000. Feedthrough 1001 is designed as shown in FIG. 16. The same components of the feedthrough as in FIGS. 16 and 15 are identified with the same reference numbers in FIG. 17. Feedthrough 1001 or respectively the battery cover with the feedthrough is tightly sealed in region 1504 with a flange 10001 of the housing of the electrical device or respectively the micro-battery by means of welding, in particular laser welding. A contact flag 1400 as in FIG. 15 is connected to conductor 1010 which is sealed in a glass material 1020 into the opening in feedthrough 1001. Via contact flag 1400 which protrudes into housing 10010 the battery in housing 10010 is electrically connected. The pressure-tight connection of the housing cover with the feedthrough with the remaining housing of the battery, which is designed in cylindrical form and which connects directly to feedthrough 1001 can occur through welding. Welding occurs preferably between feedthrough 1001 and the cylindrical housing part which accommodates the battery, in the region of tip 1504 of the feedthrough. The height of the region that is welded to tip 1504 is 5 mm at most, preferably 3 mm at most, in particular it is in the range of 1 mm to 5 mm and determines the height of the micro-battery. Pressure sealed means that the He leakage rate is less than $1 \cdot 10^{-8}$ mbar l/s at 1 bar pressure difference. The flexible flange provides sufficient flexibility, even after welding the feedthrough in the housing or with the remaining housing part.

On the basis of the compact feedthrough, the height of the entire micro-battery is at most 5 mm, preferably at most 3 mm, in particular it is in the range of 1 mm to 5 mm. The dimensions in the region of the feedthrough with the flexible flange according to FIGS. 15, 16, and 17 are as follows: the diameter of conductor 1010 is 1 mm to 2 mm, preferably 1.5 mm. The diameter of the opening is in the range of 1 mm to 4 mm, preferably 2.5 mm to 3.0 mm. The region covered by the glass material for the purpose of insulation is around 0.2 mm. The width of the entire feedthrough which is inserted into the housing is between 4.0 mm and 6.0 mm, preferably 4.5 mm. Same as in FIGS. 11 to 15, the embodiment according to FIGS. 16 and 17 is also characterized in that an area of a partial surface 1052 of the housing part is covered by an inorganic material, in particular a glass material or a glass ceramic material in order to provide an electrical insulation, for example, for a contact flag 1400 against the housing with the inserted feedthrough.

The feedthrough according to the invention is used for housings for electrical storage devices, in particular batteries of capacitors. On the basis of the very flat inventive feedthrough for an electrical storage device an electrical storage device can be provided having a total height of at most 5 mm, in particular at most 4 mm, preferably at most 3 mm, in particular in the range of 1 mm to 5 mm, preferably 1 mm to 3 mm.

Thus, a very flat feedthrough is specified for the first time, which allows for very compact components with electrical storage devices, in particular batteries or capacitors.

In addition, a feedthrough or respectively an electrical device is provided, in particular a storage device which is characterized by greater stability in regard to mechanical and/or pressure related transverse loads. The inventive feedthrough moreover has the advantage that it can be produced efficiently, that it offers an increased inside housing volume and thus greater battery or capacitor capacities and at the same time contributes to weight reduction due to reduced material use.

In addition the feedthrough can be designed in such a manner that the cap provides a safety function, in particular in regard to the battery or capacitor internal pressure.

In an alternative embodiment of the invention a feedthrough for a housing component or respectively a housing component is provided which includes a flange and which is characterized in that the feedthrough, or respectively the housing component can be tightly sealed with the housing, for example a storage device and it absorbs tensile and compressive stresses.

The invention comprises aspects which are recorded in the following propositions, which are part of the description, but which are not claims Propositions 1. Feedthrough, in particular through a housing part (1) of a housing, in particular a storage device, preferably a battery or a capacitor, consisting of metal, in particular iron, iron alloys, iron-nickel alloys, iron-nickel-cobalt alloys, KOVAR, steel, stainless steel, high-grade steel, aluminum, an aluminum alloy, AlSiC, magnesium, a magnesium alloy, titanium or a titanium alloy, wherein the housing part has at least one opening, wherein the opening receives a conductive material in a glass or glass ceramic material (2), characterized in that the conductive material is a cap-shaped element (3), in particular having a thickness or wall strength in the range of 0.1 mm to 0.3 mm.

2. Feedthrough according to proposition 1, characterized in that cap-shaped element (3) comprises side walls (10), preferably thin side walls, and/or a hollow space in the cap.

3. Feedthrough according to one of the propositions 1 to 2, characterized in that cap-shaped element (3) is a drawn component.

4. Feedthrough according to one of the propositions 1 to 3, characterized in that in addition the feedthrough comprises a conductor, in particular in the embodiment of a tongue which is connected electrically and/or mechanically with cap-shaped element (3), preferably inside cap-shaped element (3), preferably inside the hollow space of the cap.

5. Feedthrough according to proposition 3, characterized in that in the hollow space the cap of cap-shaped element (3) sensor devices, in particular temperature and/or pressure gauges are arranged.

6. Feedthrough according to one of the propositions 1 to 5, characterized in that cap-shaped element (3) includes at least one region with locally reduced thickness, in particular a base stamping (50), in particular having a thickness in the range of 10 μm to 50 μm, acting as a safety release in the event of a pressure overload.

7. Feedthrough according to one of the propositions 1 to 6, characterized in that the side wall of cap-shaped element (3) is designed conically.

8. Feedthrough according to one of the propositions 1 to 7, characterized in that cap-shaped element (3) is preferably round, with a diameter, wherein the diameter is in particular a diameter in the range of 1.5 mm to 5.0 mm, in particular 2.0 mm to 4.00 mm.

9. Feedthrough according to one of the propositions 1 to 8, characterized in that housing (1) has a first coefficient of expansion $a_1$, the glass or glass ceramic material (2) has a second coefficient of expansion $a_2$ and cap-shaped element (3) has a third coefficient of expansion $a_3$ and thermal coefficients of expansions $a_1$, $a_2$, $a_3$ are substantially the same and are preferably in the range of 3 to $7*10^{-6}$ l/K, preferably 4.5 to $5.5*10^{-6}$ l/K.

10. A housing, in particular a housing for an electrical storage device, in particular a battery or capacitor having a feedthrough according to one of the propositions 1 to 9.

11. A storage device, in particular a battery or capacitor with a housing or housing part according to proposition 10.

12. A feedthrough, in particular through a housing part (1001) of a housing, in particular of a housing, in particular a storage device, preferably a battery or a capacitor, made of metal, in particular iron, iron alloy, iron-nickel alloy, iron-nickel-cobalt alloy, KOVAR, steel, stainless steel, high-grade steel, aluminum, an aluminum alloy, AlSiC, magnesium, a magnesium alloy, titanium or a titanium alloy, wherein the housing part has at least one opening, wherein the opening receives a conductive material, preferably a conductor in a glass or glass ceramic material, characterized in that the housing part is drawn upward so that the opening is formed with a drawn-up edge (100, 300, 1003).

13. Feedthrough according to proposition 12, characterized in that drawn-up edge (100, 300, 1003) provides a glazing length (EL)

14. Feedthrough according to one of the propositions 12 to 13, characterized in that the housing part has a thickness, and the thickness is in the range of 0.1 mm to 0.3 mm.

15. Feedthrough according to one of the propositions 12 to 14, characterized in that glazing length EL is 0.3 mm to 1 mm.

16. Feedthrough according to one of the propositions 12 to 14, characterized in that the conductor is a solid conductor, preferably a pin, in particular a solid pin.

17. Feedthrough according to one of the propositions 12 to 16, characterized in that the conductor consists of a metal, in particular iron, an iron alloy, an iron-nickel alloy, an iron-nickel-cobalt alloy, KOVAR, titanium, a titanium alloy, steel, stainless steel, high-grade steel, aluminum, an aluminum alloy, AlSiC, magnesium and a magnesium alloy.

18. Feedthrough according to one of the propositions 12 to 17, characterized in that housing component (2, 1002) has a first coefficient of expansion $a_{housing}$, conductor (5, 1005), in particular the metal pin, preferably the contact pin has a second coefficient of expansion $a_{pin}$ and the glass or glass ceramic material (20) has a third coefficient of expansion $a_{glass}$ and that the difference of first, second and third coefficient of expansion is 2 ppm/K maximum, preferably 1 ppm/K maximum.

19. Feedthrough according to one of the propositions 12 to 18, characterized in that the first, second and third coefficients of expansion ($a_{pin}$, $a_{glass}$, $a_{housing}$) is in the range of 9 ppm/K to 11 ppm/K.

20. Feedthrough according to one of the propositions 12 to 19, characterized in that the wall of the drawn-up edge comprises recesses, in particular embossing, fluting or openings.

21. Feedthrough according to one of the propositions 12 to 20, characterized in that the housing component with raised edge (100, 300, 1003) includes a flange, in particular a flexible flange, or connects to a flexible flange (1110).

22. Feedthrough according to one of the propositions 12 to 21, characterized in that flexible flange (1110) includes a connecting region (1180) for connecting the flange to a housing part, in particular a battery housing part.

23. Housing, in particular a housing for an electrical storage device, in particular a battery or capacitor with a feedthrough according one of the propositions 12 to 22.

24. Storage device, in particular a battery or capacitor, with a housing or housing part according to proposition 23.

25. Storage device, in particular electrical storage device according to proposition 24, characterized in that the electrical storage device has a total height not exceeding 5 mm, in particular not exceeding 4 mm, preferably not exceeding 3 mm, in particular in the range of 1 mm to 5 mm, preferably 1 mm to 3 mm.

26. Electrical storage device according to one of the propositions 24 to 25, characterized in that the electrical storage device includes a contact device (1400), in particular a contact flag.

27. Electrical storage device according to one of the propositions 24 to 26, characterized in that the electrical storage device has a housing which is connected via a flange (1110), in particular a flexible flange with the feedthrough according to one of the propositions 21 to 22.

28. Electrical storage device according to proposition 27, characterized in that flange (1110), in particular the flexible flange is connected with the battery housing by means of welding, in particular laser welding or soldering.

29. Electrical storage device according to proposition 28, characterized in that flange (1110) is connected with the battery housing in such a way, the connection is substantially gas impermeable, and that the He leakage rate is preferably less than $1 \cdot 10^{-8}$ mbar l/s at 1 bar pressure difference.

30. Feedthrough (1001) through a housing component (1002), preferably an annular housing component with a feedthrough opening (1005) of an electrical storage device, preferably a battery or a capacitor, with at least one conductor (1010), in particular a metal pin, preferably a contact pin, in particular preferably a cap-shaped element which, by means of an inorganic material, in particular a glass or glass ceramic material (1020) is insulated in the housing feedthrough opening (1005), preferably electrically insulated from the housing component, characterized in that a plane (1110) of the housing region is arranged on the surface facing away from the housing interior outside the feedthrough opening above or below, with an offset (V) to a plane (1100) which is formed by the surface of the conductor facing away from the housing interior and that the inorganic material, in particular the glass or glass ceramic material (1020) covers at least one area of a partial surface of housing component (1052).

31. Feedthrough according to proposition 30,

Characterized in that offset (V) measures no more than 1 mm, preferably no more than 0.7 mm, and is in particular in the range of 0.1 mm to 1 mm.

32. Feedthrough according to one of the proposition 30 or 31, characterized in that housing component (1002) has a first coefficient of expansion $a_{housing}$, conductor (1005), in particular the metal pin, preferably the contact pin has a second coefficient of expansion $a_{pin}$ and the glass or glass ceramic material (1020) has a third coefficient of expansion $a_{glass}$ and that the difference of first, second and third coefficient of expansion is 2 ppm/K maximum, preferably 1 ppm/K maximum.

33. Feedthrough according to one of the propositions 30 to 32, characterized in that the first, second and third coefficients of expansion ($a_{pin}$, $a_{glass}$, $a_{housing}$) is in the range of 9 ppm/K to 11 ppm/K.

34. Feedthrough according to one of the proposition 30 to 33, characterized in that the partial surface of housing component (1052) that is covered by the inorganic material, in particular the glass or glass ceramic material (1020) has a wall thickness wherein the wall thickness is less than 1 mm, preferably less than 0.7 mm, in particular less than 0.5 mm, especially preferably less than 0.3 mm, in particular less than 0.2 mm, particularly preferably less than 0.1 mm. preferably in the range of 0.02 mm to 1 mm, in particular in the range of 0.02 mm to 0.1 mm.

35. Feedthrough according to one of the proposition 30 to 34, characterized in that housing component (1002) and/or metal pin (1005) consist of one of the following materials:

iron, an iron alloy, an iron-nickel alloy, an iron-nickel-cobalt alloy,

Kovar, steel, stainless steel, high-grade steel, ferritic high-grade steel, austenitic high-grade steel, Duplex high-grade steel aluminum an aluminum alloy, AlSiC, magnesium, a magnesium alloy, titanium, a titanium alloy.

36. Feedthrough according to one of the proposition 30 to 35, characterized in that housing component (1002) includes a raised or lowered region (1003) in the region of the feedthrough opening, in such a manner that a wall (1004) is created in the region of the feedthrough opening.

37. Feedthrough according to one of the proposition 30 to 36, characterized in that that the housing component outside raised or lowered region (1003) has a first plane (1060) and the raised or lowered region is located in a second plane (1070) and the first plane, and the first plane is angled toward the second plane, in particular vertically angled.

38. Feedthrough according to one of the proposition 30 to 37, characterized in that the glass or glass ceramic material covers an end face (1052) of the raised or lowered region.

39. Feedthrough according to one of the proposition 30 to 38, characterized in that
wall (1004) of the raised or lowered housing component comprises recesses (1200, 1202, 1204) in particular embossing, fluting or openings.

40. Feedthrough according to proposition 39,
characterized in that
the opening has a diameter and the diameter of the raised or lowered region decreases or increased in the progression of the raised or lowered region.

41. Feedthrough according to one of the proposition 30 to 40,
characterized in that
the inorganic material, in particular the glass or glass ceramic material has pores (1101) in its volume area, in particular bubble-shaped pores (1101).

42. Feedthrough according to proposition 41,
characterized in that
the share of pores (1101) in the volume of the inorganic glass or glass ceramic material is in the range of 10 volume-% to 45 volume-%, preferably 18 volume-% to 42 volume-%.

43. Feedthrough according to one of the proposition 30 to 42,
characterized in that
glass or glass ceramic material (1020) forms a glass-metal bond with end face (1052) of the raised or lowered region of the housing region, said bond being free of pores at least in the outside circumferential region of the lowered region.

44. Feedthrough according to one of the proposition 30 to 43,
characterized in that
the surface of the glass or glass ceramic material (1020) is positioned on the surface facing away from the interior of the housing, in a plane with the surface of the conductor.

45. Feedthrough according to one of the proposition 30 to 44,
characterized in that
the conductor (1005), in particular the metal pin, preferably the contact pin, in particular the cap-shaped element includes an indentation.

46. Feedthrough according to one of the proposition 30 to 45,
characterized in that
raised or lowered region (1003) progresses in a such a way that a constriction is created.

47. Feedthrough according to one of the proposition 30 to 46,
characterized in that
the raised or lowered region provides a glazing length L.

48. Feedthrough according to one of the proposition 30 to 47,
characterized in that
the raised or lowered region includes a flexible flange or connects to a flexible flange.

49. Feedthrough according to proposition 48,
characterized in that
the flexible flange includes a connection region to connect the flange to a housing part, in particular to a battery housing part.

50. Electrical storage device, in particular a battery or capacitor, in particular a micro-battery, comprising at least one feedthrough according to one of the propositions 30 to 49.

51. Electrical storage device according to proposition 50,
characterized in that
the electrical storage device has a total height not exceeding 5 mm, in particular not exceeding 4 mm, preferably not exceeding 3 mm, in particular in the range of 1 mm to 5 mm, preferably 1 mm to 3 mm.

52. Electrical storage device according to one of the propositions 50 to 51,
characterized in that
the electrical storage device includes a contact device (1400), in particular a contact flag.

53. Electrical storage device according to one of the propositions 50 to 52,
characterized in that
contact device (1400), in particular the contact flag, is electrically connected
with the conductor, in particular with metal pin (1010), and is electrically insulated from the housing via the inorganic material, in particular the glass or glass ceramic material which covers a partial surface of the housing component.

54. Electrical storage device according to proposition 53,
characterizes in that
that the thickness of the glass or glass ceramic material between the contact device, in particular contact flag (1400) and the partial surface of the housing component is in the region of 0.1 mm to 1.0 mm, in particular 0.1 mm to 0.7 mm.

55. Electrical storage device according to one of the propositions 50 to 54,
characterized in that
the electrical storage device has a housing which is connected via a flange, in particular a flexible flange with the feedthrough according to one of the propositions 30 to 49.

56. Electrical storage device according to proposition 55,
characterizes in that
the flange, in particular the flexible flange is connected with the battery housing by means of welding, in particular laser welding or soldering.

57. Electrical storage device according to proposition 56,
characterizes in that
the flange is connected with the battery housing in such a way, the connection is substantially gas impermeable, and that the He leakage rate is preferably less than $1 \cdot 10^{-8}$ mbar l/s at 1 bar pressure difference.

58. Electrical storage device according to one of the propositions 50 to 57,
characterized in that
the material of the storage device—at least for the housing region which is in contact with the inorganic material, in particular the glass or glass ceramic material—is a metal, in particular iron, an iron alloy, an iron-nickel alloy, an iron-nickel-cobalt alloy, Kovar, steel, stainless steel, high-grade steel, ferritic high-grade steel, aluminum, an aluminum alloy, AlSiC, magnesium, a magnesium alloy, titanium or a titanium alloy.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical device, comprising:

a housing part, the housing part being a monolithic structure;

a feedthrough extending through the housing part, the housing part having a material thickness T and is made of metal, the metal being iron, iron alloys, iron-nickel alloys, iron-nickel-cobalt alloys, KOVAR, steel, stainless steel, high-grade steel, aluminum, aluminum alloys, AlSiC, magnesium, magnesium alloys, titanium or titanium alloys, wherein the housing part has at least one opening, wherein the opening receives a contact element consisting of a conductive material in a glass or glass ceramic material, the housing part having a collar in the region of the opening, the collar forms an inner wall of the feedthrough at the opening, the inner wall having a height H which is greater than the material thickness T, wherein a glazing length EL of the glass or the glass ceramic material corresponds to the height H, wherein the housing part includes a flange for connection with a housing, the flange including a connecting region, the flange has a free space F between a raised or a lowered region providing the glazing length and the connecting region, wherein the flange is a flexible flange, the glass or the glass ceramic material being at least partly in contact with the opening of the housing part, the flange being nonparallel relative to the collar.

2. The electrical device of claim 1, wherein the collar is an upward bulging reshaped collar.

3. The electrical device of claim 1, wherein there is a transitional region between the collar and the housing part, the transitional region being rounded on at least one side, the at least one side including a top side, the transitional region being rounded with a radius R.

4. The electrical device of claim 1, wherein material thickness T of the housing part is in a range of 0.02 mm to 1 mm and glazing length EL of the inner wall is in a range of 0.3 mm to 1 mm.

5. The electrical device of claim 1, wherein the housing part has a first thermal coefficient of expansion $a_1$, the glass and/or glass ceramic material has a second thermal coefficient of expansion $a_2$, and the contact element has a third thermal coefficient of expansion $a_3$ and the thermal coefficients of expansion $a_1$, $a_2$ and/or $a_3$ vary by $2*10^{-6}$ 1/K at most, by no more than $1*10^{-6}$ 1/K, they are substantially the same, and/or are in the range of 3 to $7*10^{-6}$ 1/K, in the range of 4.5 to $5.5*10^{-6}$ 1/K or in the range of $9*10^{-6}$ 1/K to $11*10^{-6}$ 1/K.

6. The electrical device of claim 1, further comprising an insulating element arranged on the glass or the glass ceramic material, the insulating element consisting of a plastic material, a glass or glass ceramic material, the insulating element covering a front face of the collar, wherein (i) a plane of a surface of the collar is located below a plane of a surface of the contact element or (ii) a surface of the insulating element is located in one plane with the surface of the contact element.

7. The electrical device of claim 1 wherein the contact element is a cap-shaped element having a thickness in the range of 0.1 mm to 0.3 mm.

8. The electrical device of claim 1, wherein the feedthrough includes a connecting conductor being a tongue which is connected electrically and/or mechanically with the contact element, the contact element being a pin-shaped conductor or a cap-shaped element.

9. The electrical device of claim 8, wherein the contact element is round, with a diameter, the diameter being in a range of 1.5 mm to 5.0 mm, or the diameter is in a range of 2.0 mm to 4.00 mm.

10. The electrical device of claim 1, wherein the electrical device is an electrical storage device having a total height not exceeding 5 mm, not exceeding 4 mm, not exceeding 3 mm, in a range of 1 mm to 5 mm, or in a range of 1 mm to 3 mm.

11. The electrical device of claim 1, wherein the electrical device has the housing which is connected via the flange with the feedthrough.

12. The electrical device of claim 11, wherein the flange has a tip.

13. The electrical device of claim 12, wherein the flange is weakened in a region of the tip.

14. The electrical device of claim 13, wherein the tip of the flange has a thickness in the range of 0.05 to 0.2, or a thickness of 0.15 mm.

15. The electrical device of claim 11, wherein the flange is connected with a battery housing by welding, laser welding or soldering.

16. The electrical device of claim 15, wherein the flange is connected with the battery housing, the connection being substantially gas impermeable having an He leakage rate of less than 1·10−8 mbar l/sec.

17. The electrical device of claim 11, wherein the feedthrough has a plane of a housing region on a surface facing away from a housing interior outside of the feedthrough opening above or below, with an offset to a plane formed by a surface of the conductor facing away from the housing interior and wherein inorganic material, which is the glass or glass ceramic material, covers at least one area of a partial surface of a housing component.

18. The electrical device of claim 17, wherein the offset measures no more than 1 mm, no more than 0.7 mm, or is in a range of 0.1 mm to 1 mm.

19. The electrical device of claim 18, wherein the partial surface of the housing component that is covered by the inorganic material has a wall thickness, the wall thickness being less than 1 mm, less than 0.7 mm, less than 0.5 mm, less than 0.3 mm, less than 0.2 mm, less than 0.1 mm, in a range of 0.02 mm to 1 mm, or in a range of 0.02 mm to 0.1 mm.

20. The electrical device of claim 1, wherein a wall of the raised or lowered housing region includes recesses, embossing, fluting or openings.

21. The electrical device of claim 1, wherein the opening has a diameter and the diameter of the raised or lowered region decreases or increases in a progression of the raised or lowered region.

22. The electrical device of claim 1, wherein the glass or the glass ceramic material has pores in its volume, the pores being bubble-shaped pores.

23. The electrical device of claim 22, wherein a share of the pores in the volume of the glass or the glass ceramic material is in a range of 10 volume-% to 45 volume-%, or 18 volume-% to 42 volume-%.

24. The electrical device of claim 22, wherein the glass or the glass ceramic material forms a glass-metal bond with an end face of the raised or lowered region of the housing part, the bond being free of pores at least in an outside circumferential region of the raised or lowered region.

25. The electrical device of claim 1, wherein a surface of the glass or the glass ceramic material is positioned on a surface facing away from the interior of the housing in a plane with a surface of the conductor.

26. The electrical device of claim 1, wherein the contact element is in the form of a metal pin, a contact pin, or a cap-shaped element and includes an indentation.

27. The electrical device of claim 11, wherein the raised or lowered region progresses in such a way that a constriction is created.

28. The electrical device of claim 27, wherein the raised or lowered region has a glazing length L.

29. The electrical device of claim 1, wherein:

(i) the glass or glass ceramic material is sealed in the opening of the housing part;

(ii) the housing part is a reshaped metal part with the material thickness T;

(iii) the flange is spaced apart from the opening of the housing part; and (iv) the flange has the free space F between the raised or the lowered region—that forms the collar and provides the glazing length—and the connecting region, so that the flange is the flexible flange.

30. The electrical device of claim 1, wherein the flange extends radially outwardly to connect with the housing.

* * * * *